United States Patent
Vajapeyam et al.

(10) Patent No.: US 10,440,661 B2
(45) Date of Patent: Oct. 8, 2019

(54) RAN PROCEDURES FOR EXTENDED DISCONTINUOUS RECEPTION (DRX)

(71) Applicant: QUALCOMM Incorporated, San Diego, CA (US)

(72) Inventors: Madhavan Srinivasan Vajapeyam, San Diego, CA (US); Miguel Griot, La Jolla, CA (US); Hao Xu, San Diego, CA (US); Yongbin Wei, La Jolla, CA (US); Masato Kitazoe, Tokyo (JP); Durga Prasad Malladi, San Diego, CA (US)

(73) Assignee: QUACOMM Incorporated, San Diego, CA (US)

( * ) Notice: Subject to any disclaimer, the term of this patent is extended or adjusted under 35 U.S.C. 154(b) by 150 days.

(21) Appl. No.: 14/818,141

(22) Filed: Aug. 4, 2015

(65) Prior Publication Data
US 2016/0044605 A1 Feb. 11, 2016

Related U.S. Application Data

(60) Provisional application No. 62/034,087, filed on Aug. 6, 2014.

(51) Int. Cl.
 *H04W 52/32* (2009.01)
 *H04W 76/28* (2018.01)
 *H04W 68/02* (2009.01)
(52) U.S. Cl.
 CPC ......... *H04W 52/322* (2013.01); *H04W 76/28* (2018.02); *H04W 68/02* (2013.01)
(58) Field of Classification Search
 None
 See application file for complete search history.

(56) References Cited

U.S. PATENT DOCUMENTS

| | | | | |
|---|---|---|---|---|
| 2010/0130237 A1* | 5/2010 | Kitazoe | ................ | H04W 76/28 455/458 |
| 2012/0300685 A1* | 11/2012 | Kim | ...................... | H04W 68/02 370/311 |

(Continued)

FOREIGN PATENT DOCUMENTS

| | | |
|---|---|---|
| CN | 101646239 A | 2/2010 |
| EP | 2696631 A1 | 2/2014 |

(Continued)

OTHER PUBLICATIONS

ISA/EPO, International Search Report and Written Opinion of the International Searching Authority, Int'l Appl. No. PCT/US2015/043764, dated Oct. 22, 2015, European Patent Office, Rijswijk, NL, 10 pgs.

(Continued)

*Primary Examiner* — George C Atkins
(74) *Attorney, Agent, or Firm* — Holland & Hart LLP/ QUALCOMM Incorporated

(57) ABSTRACT

Extended DRX (e-DRX) operation using hyper frame extension signaling are described. The hyper frame extension signaling may extend the system frame number (SFN) range while maintaining backward compatibility for legacy devices not configured to use the extended SFN range. The hyper-SFN extension signaling may include an index to a hyper-SFN transmitted as part of system information different than that used for transmission of the SFN. UEs configured to use the hyper-SFN may effectively use a longer or extended SFN range that includes the legacy SFN range and the hyper-SFN range. The hyper-SFN extension may be used in an extended idle DRX (eI-DRX) mode which may coexist with existing I-DRX mode on the same paging resources. Additionally or alternatively, paging may be differentiated for eI-DRX mode UEs using separate paging (Continued)

occasions or a new paging radio network temporary identifier (RNTI).

31 Claims, 14 Drawing Sheets

(56) References Cited

U.S. PATENT DOCUMENTS

| | | |
|---|---|---|
| 2013/0028098 A1 | 1/2013 | Yuda et al. |
| 2013/0170415 A1* | 7/2013 | Fukuta ............... H04W 52/0216 370/311 |
| 2013/0301501 A1* | 11/2013 | Olvera-Hernandez ....................... H04W 52/0216 370/311 |
| 2014/0098761 A1* | 4/2014 | Lee ..................... H04W 74/006 370/329 |
| 2015/0098381 A1* | 4/2015 | Cucala Garc A ............................ H04W 52/0216 370/311 |
| 2015/0319734 A1* | 11/2015 | Zhang ................. H04W 68/005 455/458 |
| 2016/0029434 A1* | 1/2016 | Qiu .................... H04W 52/0209 370/311 |
| 2016/0037514 A1* | 2/2016 | Xiong .................... H04W 4/70 370/336 |
| 2016/0057701 A1* | 2/2016 | Choi ..................... H04W 76/28 370/311 |
| 2016/0192292 A1* | 6/2016 | Hoglund ............ H04W 52/0216 370/311 |
| 2016/0192434 A1* | 6/2016 | Du .................... H04W 52/0216 370/329 |
| 2016/0249404 A1* | 8/2016 | Hoglund ................ H04W 76/28 |

FOREIGN PATENT DOCUMENTS

| | | |
|---|---|---|
| WO | WO-2014098663 A1 | 6/2014 |
| WO | WO-2014113074 A1 | 7/2014 |
| WO | WO-2015020591 A1 | 2/2015 |

OTHER PUBLICATIONS

Ericsson, et al., "Extending DRX Cycles Beyond the Current SFN Range", 3GPP TSG-RAN WG2#83, R2-132806, 3GPP, Aug. 10, 2013, pp. 1-7.

Huawei (Rapporteur): "Summary of Email Discussion [82#13] [Joint/MTCe] Evaluation of Extended DRX Cycles for UEPCOP", 3GPP TSG-RAN WG2#83, R2-132893, 3GPP, Aug. 22, 2013, pp. 1-23.

Interdigital Communications: "Supporting Extended Drx in RRC_IDLE Mode", 3GPP TSG RAN WG2 Meetings #83, Barcelona, Spain, R2-132436, Aug. 23, 2013, 6 Pages.

Mediatek Inc: "Analysis of Extending Paging Cycle in Idle Mode", 3GPP TSG-RAN WG2#81bis R2-131036, 3GPP, Apr. 5, 2013, pp. 1-4.

Catt: "Considerations on Extending DRX Cycle Longer than Maximum SFN", 3GPP TSG-RAN WG2 Meeting #81, R2-130997, Apr. 5, 2013, pp. 1-3.

* cited by examiner

RAN PROCEDURES FOR EXTENDED DISCONTINUOUS RECEPTION (DRX)

CROSS REFERENCES

The present application for patent claims priority to U.S. Provisional Patent Application No. 62/034,087 by Vajapeyam et al., entitled "RAN Procedures for Extended Discontinuous Reception (DRX)," filed Aug. 6, 2014, assigned to the assignee hereof.

BACKGROUND

Field of the Disclosure

The present disclosure, for example, relates to wireless communication systems, and more particularly to enhancing discontinuous reception (DRX) for improved performance and power savings.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

A UE may not continuously receive or transmit data. In some cases the UE may utilize a discontinuous reception (DRX) cycle during which the UE periodically turns some radio components off to conserve power and then reactivates the components if it has data to transmit or to monitor for an indication that data may be available for reception. The DRX mode of operation can greatly reduce the amount of power consumed by the UEs.

SUMMARY

The described features generally relate to one or more improved systems, methods, and/or apparatuses for extending discontinuous reception (DRX) operation using hyper frame extension signaling. The described features include supporting legacy user equipments (UEs) with a repeating frame cycle for DRX mode while providing for extended DRX cycles for non-legacy UEs using an extended frame cycle based on a legacy system frame number (SFN) and a hyper-SFN. A cell may broadcast a default extended DRX cycle for extended DRX operation according to the extended frame cycle. Additionally or alternatively, non-legacy UEs may request a UE-specific extended DRX cycle. Paging for the UEs operating using extended DRX may coexist with paging for UEs using the existing DRX mode on the same paging resources. Additionally or alternatively, paging may be differentiated for the extended DRX mode UEs using separate paging occasions or a new paging radio network temporary identifier (RNTI).

A method for DRX operation in a wireless communication system is described, the method including broadcasting a frame index, the frame index being used to determine a frame number of a repeating frame cycle utilized for a first DRX mode by at least one legacy UE, and broadcasting a hyper frame index of a repeating hyper frame cycle, each hyper frame cycle comprising a plurality of frame cycles and utilized for a second DRX mode by at least one non-legacy UE.

An apparatus for DRX operation in a wireless communication system is described, the apparatus including means for broadcasting a frame index, the frame index being used to determine a frame number of a repeating frame cycle utilized for a first DRX mode by at least one legacy UE, and means for broadcasting a hyper frame index of a repeating hyper frame cycle, each hyper frame cycle comprising a plurality of frame cycles and utilized for a second DRX mode by at least one non-legacy UE.

An apparatus for DRX operation in a wireless communication system is described, the apparatus including a processor and a memory in electronic communication with the processor and instructions stored in the memory. In aspects, the instructions are executable by the processor to broadcast a frame index, the frame index being used to determine a frame number of a repeating frame cycle utilized for a first DRX mode by at least one legacy UE, and to broadcast a hyper frame index of a repeating hyper frame cycle, each hyper frame cycle comprising a plurality of frame cycles and utilized for a second DRX mode by at least one non-legacy UE.

A non-transitory computer-readable medium storing code for DRX operation in a wireless communication system is described. In aspects, the code includes instructions executable by a processor for broadcasting a frame index, the frame index being used to determine a frame number of a repeating frame cycle utilized for a first DRX mode by at least one legacy UE, and for broadcasting a hyper frame index of a repeating hyper frame cycle, each hyper frame cycle comprising a plurality of frame cycles and utilized for a second DRX mode by at least one non-legacy UE.

Some examples of the method described above may include configuring the at least one non-legacy UE for the second DRX mode according to an extended DRX cycle greater than a maximum DRX cycle available for the first DRX mode. Some examples of the method described above may include broadcasting the extended DRX cycle for the second DRX mode. Some examples of the method described above may include transmitting paging information for the at least one non-legacy UE in a paging occasion of the extended DRX cycle. The paging information may be identified by a second RNTI that is different from a first RNTI used by the at least one legacy UE for receiving paging information. Some examples of the method described above may include synchronizing modification of system information to the extended DRX cycle. Some examples of the apparatuses and/or non-transitory computer-readable medium described above may include means for, instructions that are executable by the processor for, and/or code for performing these features.

In some examples of the method described above, broadcasting the hyper frame index includes transmitting the hyper frame index using a second information block different from a first information block used for broadcasting the frame index. In some examples of the method described above, broadcasting the frame index comprises transmitting the frame index via a physical broadcast channel. In some examples of the method described above, broadcasting the hyper frame index comprises transmitting the hyper frame index in a system information block (SIB) via a physical downlink data channel. In some examples of the apparatuses and/or non-transitory computer-readable medium described above may include means for, instructions that are executable by the processor for, and/or code for performing these features.

In some examples of the method, apparatuses, and/or non-transitory computer-readable medium described above, the second DRX mode is an idle DRX (I-DRX) mode.

A method for DRX operation in a wireless communication system is described, the method including computing a frame index, the frame index indicating a frame number of a repeating frame cycle utilized by legacy UEs for a first DRX mode, receiving a hyper frame index of a repeating hyper frame cycle, determining an extended frame index of a repeating extended frame cycle based on the frame index and the hyper frame index, identifying a configuration for an extended DRX cycle of a second DRX mode, wherein the extended DRX cycle is greater than a maximum DRX cycle available for the first DRX mode, and monitoring at least one paging occasion of the extended frame cycle according to the extended DRX cycle.

An apparatus for DRX operation in a wireless communication system is described, the apparatus including means for computing a frame index, the frame index indicating a frame number of a repeating frame cycle utilized by legacy UEs for a first DRX mode, means for receiving a hyper frame index of a repeating hyper frame cycle, means for determining an extended frame index of a repeating extended frame cycle based on the frame index and the hyper frame index, means for identifying a configuration for an extended DRX cycle of a second DRX mode, wherein the extended DRX cycle is greater than a maximum DRX cycle available for the first DRX mode, and means for monitoring at least one paging occasion of the extended frame cycle according to the extended DRX cycle.

An apparatus for DRX operation in a wireless communication system is described, including a processor; a memory in electronic communication with the processor and instructions stored in the memory, the instructions being executable by the processor to compute a frame index, the frame index indicating a frame number of a repeating frame cycle utilized by legacy UEs for a first DRX mode, receive a hyper frame index of a repeating hyper frame cycle, determine an extended frame index of a repeating extended frame cycle based on the frame index and the hyper frame index, identify a configuration for an extended DRX cycle of a second DRX mode, wherein the extended DRX cycle is greater than a maximum DRX cycle available for the first DRX mode, and monitor at least one paging occasion of the extended frame cycle according to the extended DRX cycle.

A non-transitory computer-readable medium storing code for DRX operation in a wireless communication system is described. In some examples, the code includes instructions executable by a processor for computing a frame index, the frame index indicating a frame number of a repeating frame cycle utilized by legacy UEs for a first DRX mode, receiving a hyper frame index of a repeating hyper frame cycle, determining an extended frame index of a repeating extended frame cycle based on the frame index and the hyper frame index, identifying a configuration for an extended DRX cycle of a second DRX mode, wherein the extended DRX cycle is greater than a maximum DRX cycle available for the first DRX mode, and monitoring at least one paging occasion of the extended frame cycle according to the extended DRX cycle Some examples of the method described above may include determining the at least one paging occasion based on an extended UE identifier having a range of possible values larger than a number of indices of the repeating frame cycle. Some examples of the method described above may include receiving paging information in the at least one paging occasion. The paging information may be identified by a second RNTI that is different from a first RNTI used by the legacy UEs for receiving paging information. Some examples of the apparatuses and/or non-transitory computer-readable medium described above may include means for, instructions that are executable by the processor for, and/or code for performing these features.

In some examples of the method described above, computing the frame index comprises receiving the frame index via a physical broadcast channel. In some examples of the method described above, receiving the hyper frame index comprises receiving the hyper frame index in a SIB via a physical downlink data channel. Some examples of the apparatuses and/or non-transitory computer-readable medium described above may include means for, instructions that are executable by the processor for, and/or code for performing these features.

In some examples of the method, apparatuses, and/or non-transitory computer-readable medium described above the second DRX mode is an I-DRX mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques generally relating to one or more improved systems, methods, and/or apparatuses for extended DRX (e-DRX) operation using hyper frame extension signaling are described. The hyper frame extension signaling may extend the system frame number (SFN) range while maintaining backward compatibility for legacy devices not configured to use the extended SFN range. The hyper-SFN extension signaling may include an index to a hyper-SFN transmitted as part of system information. UEs configured to use the hyper-SFN (e.g., non-legacy UEs) may effectively use a longer SFN index that includes the legacy SFN range and the hyper-SFN range. The hyper-SFN extension may be used in an extended idle DRX (eI-DRX) mode which may coexist with existing I-DRX mode on the same paging resources. Paging monitoring resources may be any resources which may indicate, or otherwise help determine, the paging resources. Additionally or alternatively, paging may be differentiated for eI-DRX mode UEs using separate paging occasions or a new paging radio network temporary identifier (RNTI).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
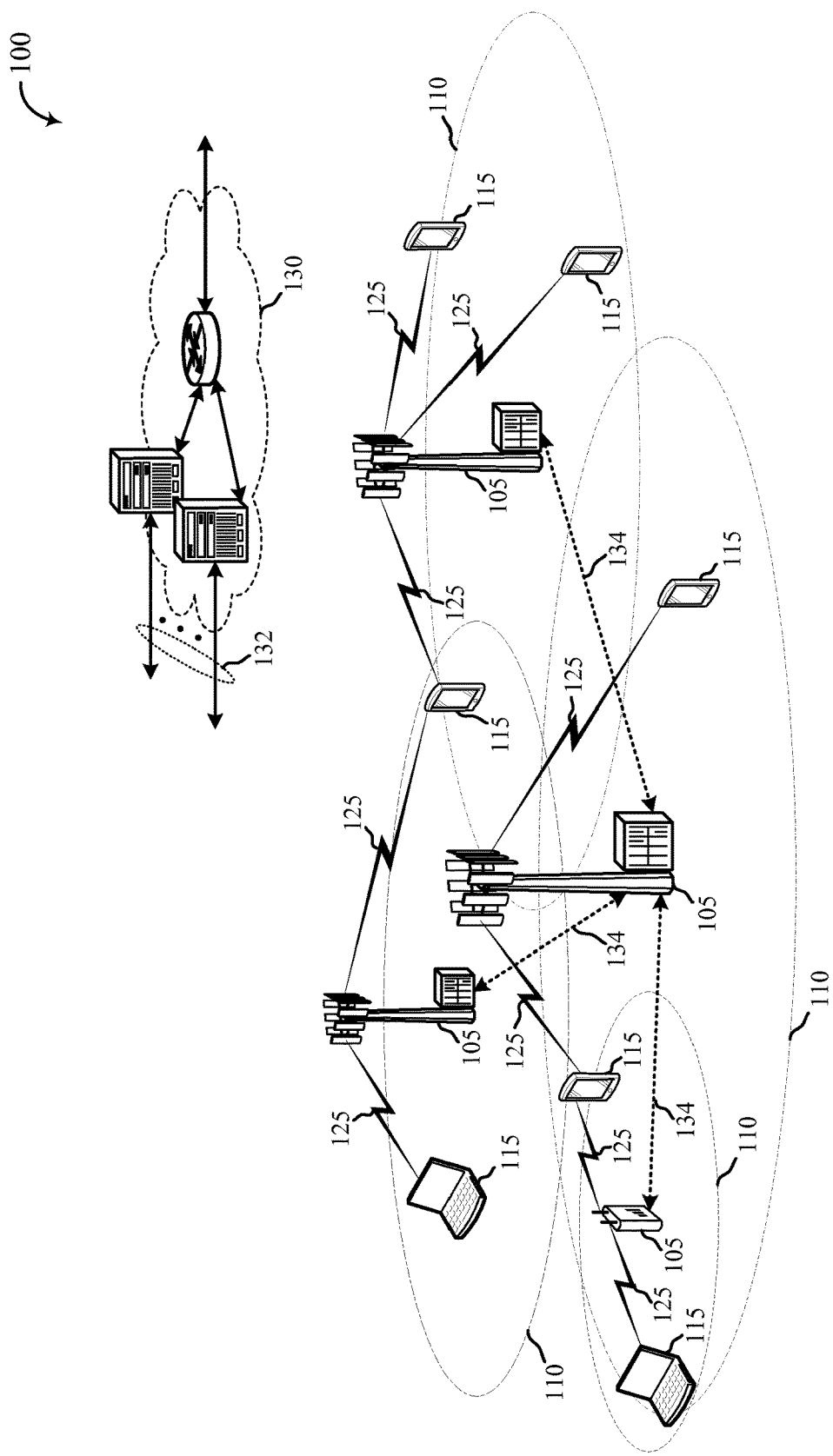
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a waveform signal made up of multiple sub-carriers (e.g., signals of different frequencies) modulated with information (e.g., reference signals, control information, overhead information, user data, etc.). The communication links 125 may transmit bidirectional communications using FDD (e.g., using paired spectrum resources) or TDD operation (e.g., using unpaired spectrum resources).

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal sub-carriers, which are also commonly referred to as tones, bins, or the like. Each sub-carrier may be modulated with information. The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guard-band) of 1.4, 3, 5, 10, 15, or 20 megahertz (MHz), respectively. The carrier bandwidth may also be partitioned into sub-bands. For example, a sub-band may cover 1.08 MHz, and a carrier may have 1, 2, 4, 8 or 16 sub-bands.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. "The term 'component carrier' (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth and, e.g., higher data rates. CCs used in CA operation may be any suitable bandwidth (e.g., 1.4, 3, 5, 10, 15, or 20 megahertz (MHz), etc.), and each individual CC may provide the same capabilities as, for instance, a single carrier based on Release 8 or Release 9 of the LTE standard. Thus, individual CCs may be backwards compatible with UEs 115 implementing LTE Release 8 or Release 9, while also being utilized by UEs 115 implementing LTE versions after Release 8/9 configured for CA or in single carrier mode. Alternatively, a CC may be configured to be used in combination with other CCs and may not carry some channels used to support single carrier mode (e.g., format or control channels, etc.). CA may be used with both FDD and TDD component carriers.

In LTE/LTE-A, radio frames for each cell are indexed by a subframe number (SFN). Because the SFN has ten bits and each radio frame is 10 ms long, each frame cycle of 1024 radio frames spans 10.24 s. The eight most significant bits of the SFN are broadcast in a master information block (MIB) that is transmitted in each radio frame. The two least significant bits can be deduced from the four radio frame cycle used to transmit one complete broadcast channel (BCH) transmission time interval (TTI). As discussed in further detail below, in some instances, additional bits may be included in an SFN to extend the frame cycle for a set of subframes having SFN of a given length. The additional bits, for example, may be appended to the legacy SFN length of ten bits. In some aspects, a ten-bit legacy SFN may be extended by six bits to enable a frame cycle to span approximately 655.36 seconds. The longer frame cycle may facilitate implementation of a longer idle mode DRX cycle, or eI-DRX.

UEs 115 may be identified by a permanent subscriber identity such as an international mobile subscriber identity (IMSI), which may be stored in a module (e.g., subscriber identity module (SIM), etc.), which may be removable or permanently installed in the UE 115. Generally, a UE 115 may be either in an idle mode (RRC_Idle) or a connected mode (RRC_Connected). In the idle mode, the UE 115 performs cell selection and reselection and registers itself within the network, but does not actively communicate user data. The UE 115 also listens to paging messages in idle mode to identify, receive, or process incoming data (e.g., calls, etc.), changes in system information, and notifications (e.g., emergency notifications, etc.). Monitoring for paging messages includes monitoring the PDCCH at predetermined intervals for paging control messages scrambled with a paging radio network temporary identifier (P-RNTI). If found, the paging control messages provide a pointer to a paging message for paging information for the UE 115. The process of monitoring the PDCCH discontinuously for paging control messages during the idle state is known as idle discontinuous reception (I-DRX).

When a paging message is received, the UE 115 performs a random access procedure to transition to the connected mode for transfer of data between the eNB 105 and UE 115. In connected mode, the UE 115 continuously monitors the PDCCH according to a cell radio network temporary identifier (C-RNTI) assigned by the eNB 105 in the connection procedure. In some instances, the UE 115 may also be configured for DRX operation in connected mode, known as connected DRX (C-DRX).

In I-DRX, the UE 115 monitors the PDCCH for paging according to a paging cycle determined by the DRX cycle. Each cell broadcasts a cell-specific DRX cycle that has a value of 32, 64, 124, or 256. A UE 115 can request a different UE-specific DRX cycle within an attach request. The range of values that the UE can request are the same as the available values for the cell-specific DRX cycle. Thus, the maximum DRX cycle in LTE is 2.56 s.

A subframe where a paging control message may be addressed to the UE 115 with the P-RNTI is known as a paging occasion (PO). A paging frame (PF) is a radio frame which contains one or more POs. The PF is determined by the DRX parameters as subframes that satisfy the following formula:

$$SFN \bmod T = (T \text{ div } N)*(UE\_ID \bmod N)$$

where:

T: DRX cycle of the UE. T is the shortest of the UE specific DRX value, if assigned, and the default DRX value broadcast by the cell.

nB: number of paging occasions in a cell specific DRX cycle (4T, 2T, T, T/2, T/4, T/8, T/16, T/32).

N: min(T, nB)

UE_ID: IMSI mod 1024

An index i_s pointing to a PO within a subframe pattern shown in Tables 1 and 2 below is derived from the following formula:

$$i\_s = \text{floor}(UE\_ID/N) \bmod Ns$$

where:

Ns: max(1,nB/T).

TABLE 1

PO(s) for FDD

| Ns | i_s = 0 | i_s = 1 | i_s = 2 | i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

PO(s) for TDD

| Ns | i_s = 0 | i_s = 1 | i_s = 2 | i_s = 3 |
|---|---|---|---|---|
| 1 | 0 | N/A | N/A | N/A |
| 2 | 0 | 5 | N/A | N/A |
| 4 | 0 | 1 | 5 | 6 |

While the current I-DRX mechanism may be sufficient for devices such as smartphones where a high degree of connectivity is desired, some devices may have different power and connectivity requirements that make the current maximum DRX cycle inefficient. For example, devices such as machine type communications devices may be active infrequently and may have a more limited power budget. Machine type communications (MTC) may refer to communication involving at least one remote device on at least one end of the communication and may include forms of data communication which involve one or more entities that do not necessarily need human interaction. Some UEs may be considered machine-type communication (MTC) UEs, which may include remote devices, such as sensors, meters, location tags, etc., that may communicate with a base station, another remote device, or some other entity. MTC UEs may include UEs that are capable of MTC communications with MTC servers and/or other MTC devices through Public Land Mobile Networks (PLMNs), for example.

One proposed solution allows UEs to enter a Power Saving Mode (PSM) when an active timer expires after transitioning from connected mode to idle mode. In the PSM, the UE is unreachable for paging and stops access stratum activities. PSM is exited if mobile originated (MO) data is generated or based upon a periodic tracking area update (TAU) timer. The active timer and periodic TAU timer can be negotiated by the UE and the eNB. However, upon exiting PSM, the UE performs a TAU procedure, which includes a random access procedure to exchange RRC signaling and non-access stratum (NAS) signaling for updating the tracking area assigned to the UE. Thus, this procedure incurs substantial power consumption in the TAU procedure at the end of each PSM period.

The components of system 100, such as the UEs 115 and eNBs 105, may be configured for extended DRX (e-DRX) operation using hyper-SFN extension signaling. The hyper-SFN extension signaling may extend the SFN range while maintaining backward compatibility (e.g., on the same cell) for legacy UEs not configured to use the extended SFN range. The hyper-SFN extension signaling may include an index to a hyper-SFN transmitted as part of system information. UEs configured to use the hyper-SFN (e.g., non-legacy UEs) may effectively use a longer or extended SFN index to an extended SFN range that includes the legacy SFN range and the hyper-SFN range. The hyper-SFN extension may be used in an extended idle DRX (eI-DRX) mode which may coexist with existing I-DRX mode on the same paging resources. Paging monitoring resources may be any resources which may indicate, or otherwise help determine, the paging resources. Additionally or alternatively, paging may be differentiated for eI-DRX mode UEs using separate paging occasions or a new paging RNTI. For clarity, the present disclosure describes techniques for extended DRX operation applied to I-DRX operation. However, the described techniques for extending DRX operation using hyper-SFN extension signaling can be applied to C-DRX operation, in some instances.

Figure 2:
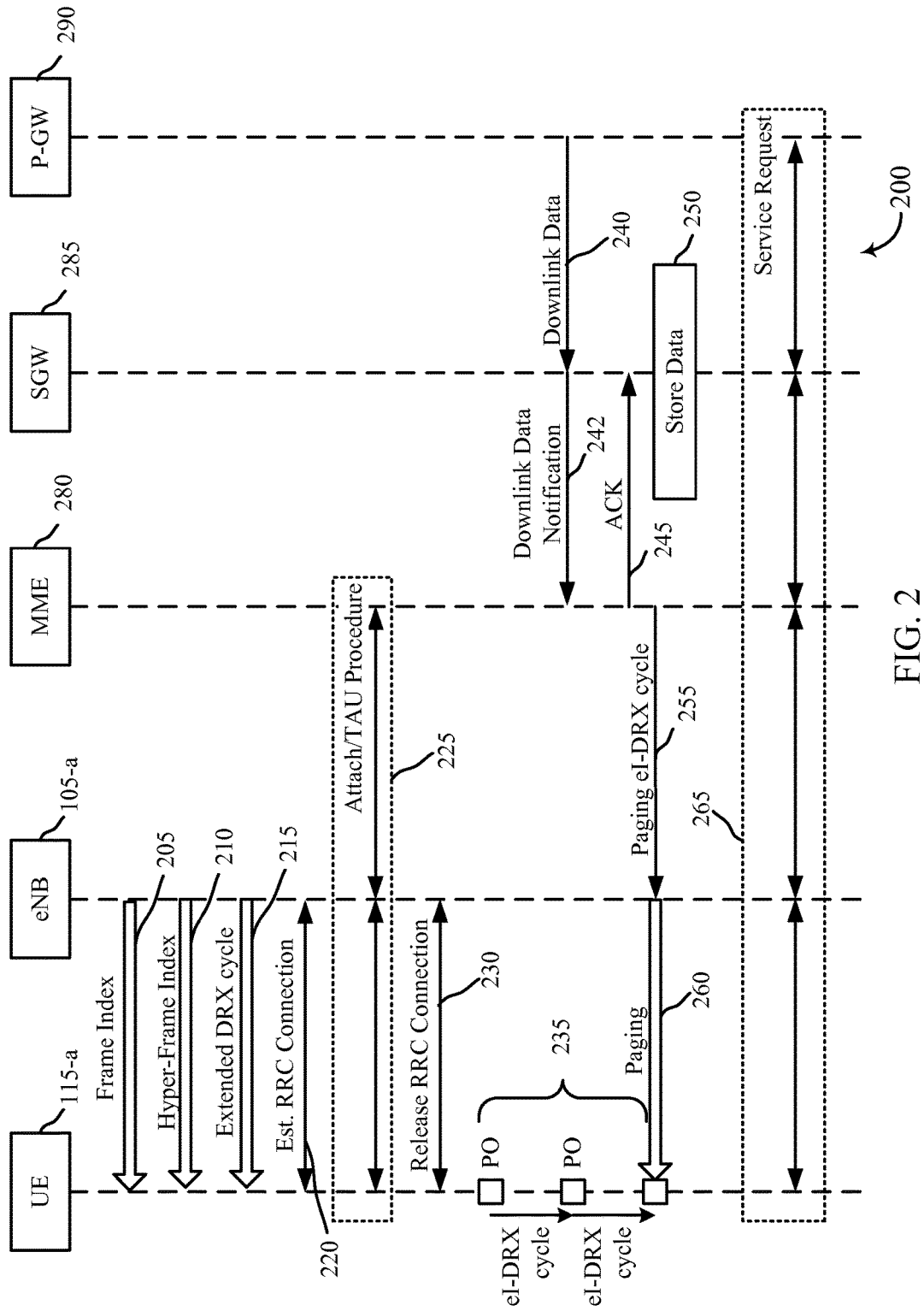
FIG. 2 shows a flow diagram illustrating an example of hyper frame extension signaling in accordance with various aspects of the present disclosure.

FIG. 2 shows a flow diagram 200 illustrating an example of hyper-SFN extension signaling in accordance with various aspects of the present disclosure. Flow diagram 200 may illustrate, for example, a message flow for a UE 115-a configured to use hyper-SFN signaling for eI-DRX operation (e.g., non-legacy UE). The non-legacy UE 115-a may be an example of one of the UEs 115 illustrated in FIG. 1.

An eNB 105-a, which may be an example of one of the eNBs 105 of FIG. 1, is shown in the flow diagram 200. Flow diagram 200 also shows a mobility management entity (MME) 280, a serving gateway (SGW) 285, and a packet gateway (P-GW) 290, which may be part of the core network 130 illustrated in FIG. 1.

The eNB 105-a may broadcast the frame index 205, which may be an index to a legacy SFN range. For example, the eNB 105-a may transmit the eight most-significant bits of the SFN in the MIB. The MIB may be transmitted via the physical broadcast channel (PBCH).

Figure 3:
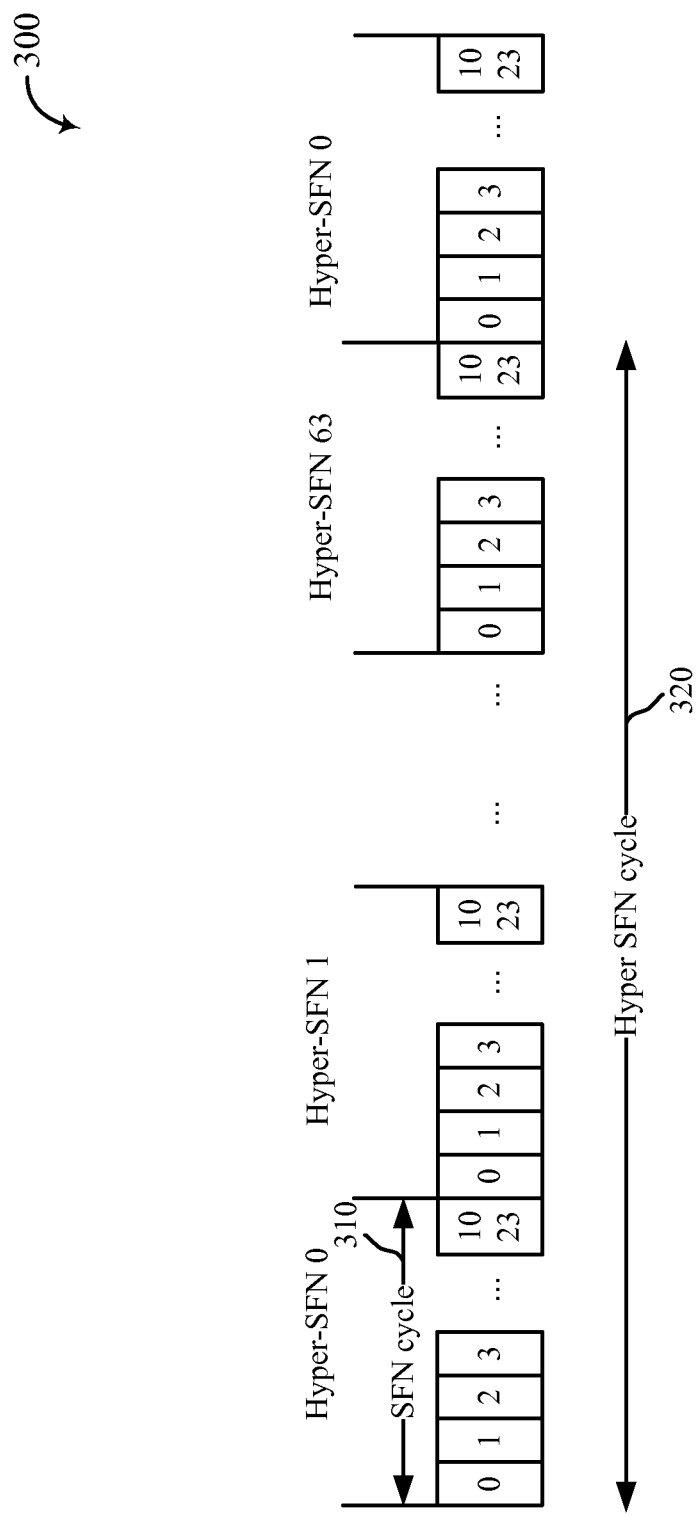
FIG. 3 shows a timing diagram of example hyper frame timing in accordance with various aspects of the present disclosure.

The eNB 105-a may also broadcast the hyper frame index 210. The hyper frame index 210 may be broadcast by transmitting an index to the hyper-SFN as part of a system information block (SIB) that is different from the MIB. For example, the index to the hyper-SFN may be transmitted in SIB1 or SIB2. SIB1 and SIB2 may be transmitted via a data channel (e.g., PDSCH). The number of bits in the hyper-SFN may be selected to provide an extended SFN that provides a desired range in eI-DRX operation. For example, the hyper-SFN may extend the SFN by six bits, which enables a hyper-SFN span of 655.36 s (approximately 11 minutes). FIG. 3 shows a timing diagram 300 of example extended SFN frame timing in accordance with various aspects of the present disclosure. Timing diagram 300 illustrates a six-bit hyper SFN cycle 320 including 64 SFN cycles 310, where each SFN cycle 310 includes 1024 frames. Thus, the extended SFN cycle, indexed by the hyper SFN and legacy SFN, spans 65,536 frames. Other bit lengths (e.g., 4, 5, 7, 8, 10, etc.) for the hyper-SFN may be selected as appropriate or desired.

Returning to FIG. 2, the eNB 105-a may also broadcast an extended DRX cycle 215. The broadcast extended DRX cycle 215 may indicate the default extended DRX cycle for an eI-DRX paging cycle. The extended DRX cycle 215 may be transmitted in a SIB (e.g., SIB1, SIB2, etc.) and may have the same number of bits as the hyper-SFN.

As shown in flow diagram 200, the UE 115-a may establish an RRC connection with the eNB 105-a at 220. The UE 115-a may perform network attachment and tracking area update (TAU) at 225. The network attachment and TAU procedure may include authentication of the UE 115-a on the network, security setup, and assignment of network resources (e.g., MME 280, bearers, etc.) for communication via the network.

Where no communication activity is on-going, the UE 115-a may release the RRC connection at 230. The UE 115-a may then enter eI-DRX mode of operation for receiving paging from the network at 235. Thus, the UE 115-a may follow the determined PFs and POs for eI-DRX operation at 235. Determining PFs and POs for eI-DRX operation is discussed in more detail below.

Downlink data 240 for the UE 115-a may be received and transferred from the P-GW 290 to the SGW 285. The SGW 285 may notify the MME 280 of the downlink data at 242. The MME 280 may acknowledge the downlink data notification 242 at 245. The SGW 285 may then store the downlink data at 250.

The MME 280 may send paging messages 255 to eNBs 105 within the tracking area for UE 115-a. The eNB 105-a may broadcast a paging message 260 at a PO for the UE 115-a determined according to the eI-DRX paging cycle. The UE may receive the paging message 260 and the downlink data 240 may be transferred in the communications for the service request at 265.

Figure 4:
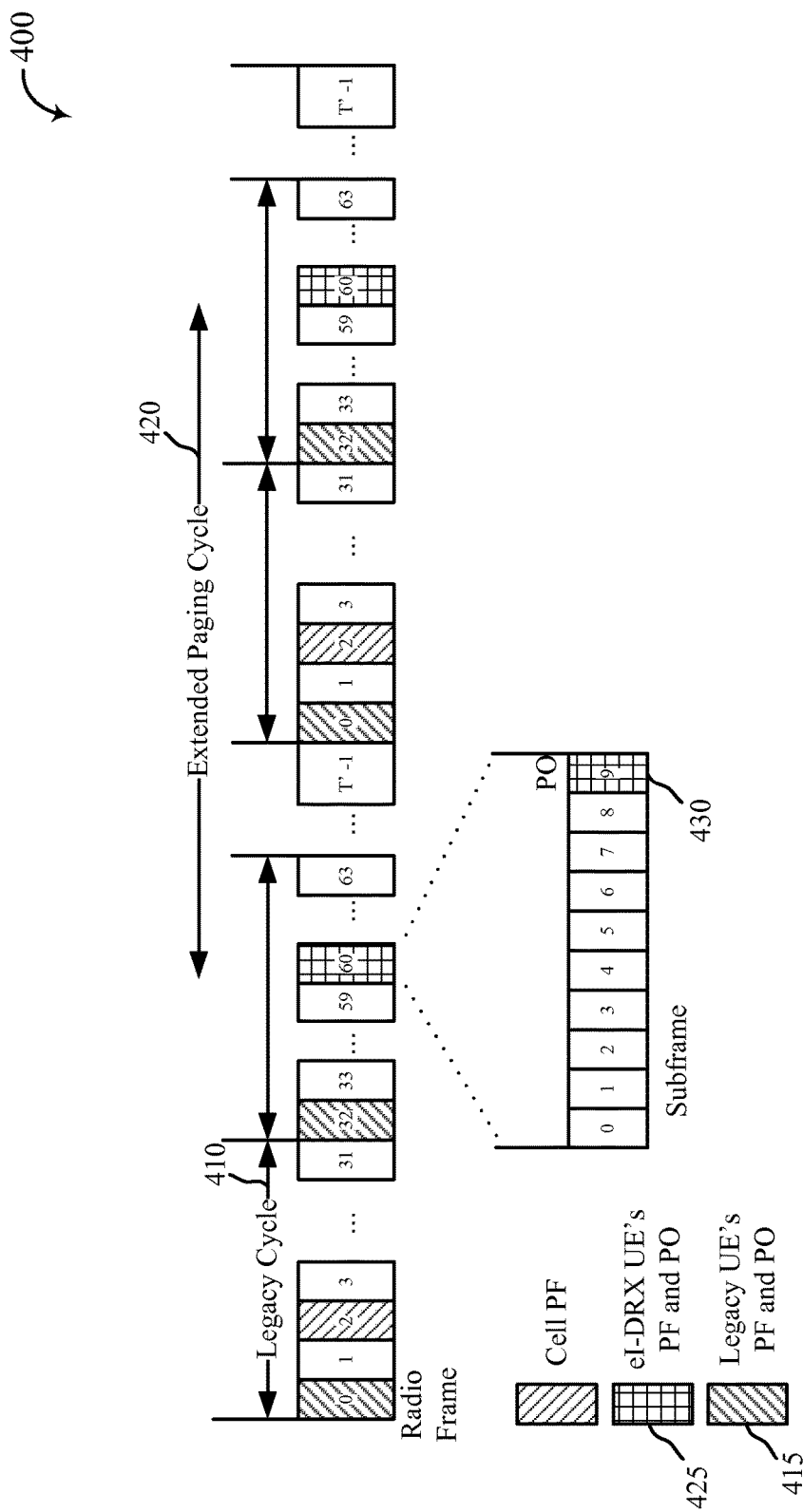
FIG. 4 shows a timing diagram of example legacy DRX and extended DRX operation in accordance with various aspects of the present disclosure.

FIG. 4 shows a timing diagram 400 of example legacy DRX and eI-DRX operation in accordance with various aspects of the present disclosure. For legacy DRX operation, the DRX cycle T=32 frames (320 ms) and the paging occasion parameter nB=T/2. Thus, for a legacy UE with UE_ID=0, the legacy UE PFs 415 are radio frames where the SFN mod 32=0.

For eI-DRX operation, the PFs and POs may be determined by the following formulae, with the eI-DRX parameters provided in system information (e.g., MIB, SIB1, SIB2, etc.).

PF' may be paging subframes for eI-DRX operation that satisfy:

$$SFN' \bmod T'=(T' \text{ div } N')*(UE\_ID' \bmod N')$$

Index i_s' for determining PO' (e.g., from Tables 1 and 2 above) may be given by:

$$i\_s'=\text{floor}(UE\_ID'/N') \bmod Ns'$$

where:

T': eI-DRX cycle of the UE. T' may be the shortest of a UE specific eI-DRX value, if assigned, and the default eI-DRX value broadcast by the cell.

nB': number of paging occasions in an eI-DRX cycle (4T', 2T', T', T'/2, T'/4, T'/8, T'/16, T'/32).

N': min(T', nB')

NS': max(1,nB'/T')

UE_ID': IMSI mod $2^n$

In timing diagram 400, the eI-DRX cycle T'=$2^{15}$=32768=327.68 s and the paging occasion parameter nB' for eI-DRX operation is T'/2=0.5T'. While the paging occasion parameter nB' is shown defined by the same coefficient as the paging occasion parameter nB for legacy DRX operation (e.g., 0.5) in FIG. 4, the parameter nB' may have a different coefficient. The paging occasion parameter nB' for eI-DRX operation may, for example, be transmitted (e.g., in SIB1 or SIB2, etc.) separately from the paging occasion parameter nB for legacy DRX operation.

For a non-legacy UE 115 in eI-DRX operation as shown in FIG. 4, the UE_ID' may be 30. The UE_ID' may be provided with an extended range when compared to the UE_ID for legacy UEs due to the increase in paging frames in the hyper SFN range used for eI-DRX operation. For example, the UE_ID' may be defined as UE_ID'=(IMSI mod $2^n$), where n may be determined based on the legacy SFN range $R_{LEGACY}$ and/or hyper SFN range $R_{HYPER}$. For example, n may be determined as n=$\log_2(R_{LEGACY})$+$\log_2(R_{HYPER})$+c, where c may account for the possibility of multiple (e.g., 2, 4, etc.) paging occasions per eI-DRX cycle. In one embodiment, the number of paging occasions in an eI-DRX cycle may have a range of values of (4T', 2T', T', T'/2, T'/4, T'/8, T'/16, T'/32), and the parameter c may be 2. Thus, for a hyper-SFN cycle having 64 frame cycles ($R_{HYPER}$=64), where each frame cycle is a legacy frame cycle including 1024 radio frames, n may be equal to 18.

As illustrated in FIG. 4, the example non-legacy UE 115 may have an extended paging cycle 420 of T'=327.68 s and PFs 425 for eI-DRX defined by radio frames having SFN' mod T'=2*UE_ID'=60. The POs 430 within PFs 425 may be given by Tables 1 and 2 according to i_s'=0.

As described above, the cell may broadcast a default eI-DRX cycle value. Additionally or alternatively, a non-legacy UE 115 may request a different UE-specific eI-DRX cycle value (e.g., via RRC signaling, etc.). As described above, the value of T' used for determining the extended paging cycle and paging frames may be the shortest of the UE specific eI-DRX cycle value, if assigned, and the default eI-DRX cycle value broadcast by the cell.

In some cases, it may be desirable to differentiate paging for legacy UEs using the legacy I-DRX mode and non-legacy UEs using the eI-DRX mode. In some embodiments, separate paging frames or paging occasions may be defined for eI-DRX mode. For example, different tables may be used for defining POs for eI-DRX mode from the index i_s'. Additionally or alternatively, an extended paging RNTI (eP-RNTI) may be used for eI-DRX UEs. The eP-RNTI may be statically defined or may be broadcast by the cell in system information (e.g., SIB1, SIB2, etc.).

Generally, changes to system information broadcast over the broadcast control channel (BCCH) can occur according to modification period boundaries. The modification period is defined by the default DRX cycle multiplied by a modification period coefficient (e.g., 2, 4, 8, 16). When system information updates are due to occur, eNBs 105 generally broadcast paging messages to each UE during a previous modification period for changes applied to the next modification period.

In some cases, UEs using eI-DRX mode may not have a paging occasion during each modification period for system information. Thus, non-legacy UEs may miss notification of changes in system information if the eI-DRX cycle is greater than the modification period. In embodiments, eNBs supporting eI-DRX utilize an extended system information modification period based on the eI-DRX cycle. For example, the extended system information modification period may be equal to the default eI-DRX cycle broadcast for the cell.

Figure 5:
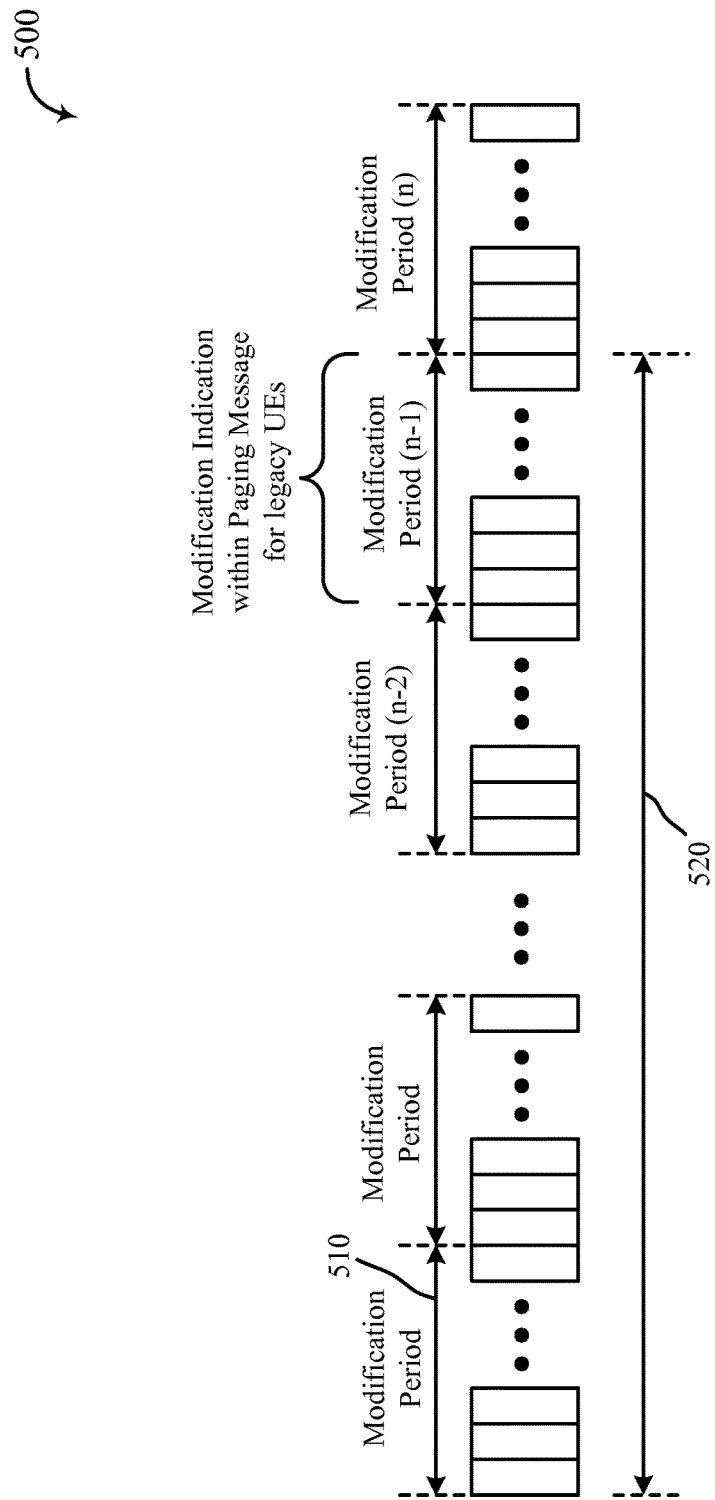
FIG. 5 shows a timing diagram illustrating an example of an extended system information modification period in accordance with various aspects of the present disclosure.

FIG. 5 shows a timing diagram 500 illustrating an example of an extended system information modification period in accordance with various aspects of the present disclosure. As shown in timing diagram 500, an extended system information modification period 520 may span a number of legacy modification periods 510. As shown in FIG. 5, modification indications for legacy UEs may be sent in paging messages during a modification period (n−1) for modifications occurring on the boundary of modification period (n−1) and modification period (n). Modification period (n−1) may be the last modification period 510 within the extended system information modification period 520.

As described above, non-legacy UEs in eI-DRX mode may have only one paging frame during the extended system information modification period 520. However, modifications may not occur until the end of the extended system information modification period 520. The non-legacy UEs may monitor for the updated system information in various ways. In one example, a modification indication for non-legacy UEs in eI-DRX mode may indicate an offset (e.g., number of modification periods 510, number of frames, etc.) until the system information modification is due to occur. In this manner, the non-legacy UEs in eI-DRX mode may remain in a low-power state until the system information modification is due to occur. Alternatively, non-legacy UEs in eI-DRX mode may, upon receiving a paging message with a modification indication during the extended system information modification period 520, monitor system information at additional time periods until a change in system information is detected. For example, the non-legacy UEs may check for system information updates at least once during each modification period. Alternatively, the non-legacy UEs may check for system information updates at multiples of their eI-DRX cycle (e.g., T'/2, T'/4, etc.). The configured system information for the UE may then be updated based on the changed system information. Once the change in system information is detected, the non-legacy UE may return to the eI-DRX cycle to monitor for paging.

In yet other embodiments, non-legacy UEs in eI-DRX mode may, upon receiving a paging message with a modification indication during the extended system information modification period 520, switch to operation according to the legacy I-DRX mode until a second paging message with a second modification indication is detected during modification period (n−1). The non-legacy UE may then update the system information during modification period (n) and then return to eI-DRX mode.

Figure 6:
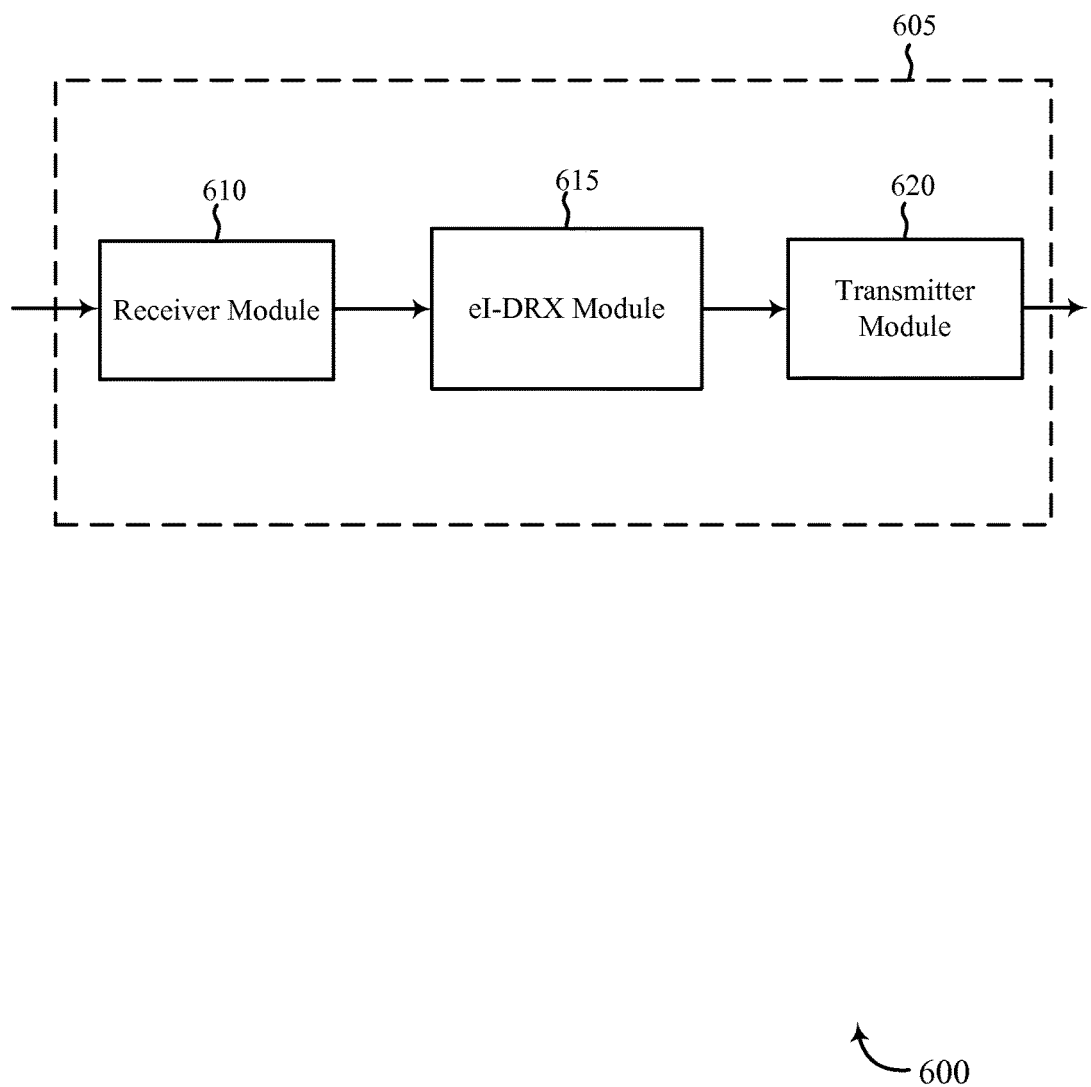
FIG. 6 shows a block diagram of a device for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 described with reference to FIGS. 1 and 2. The device 605 may include a receiver module 610, an eI-DRX module 615, and/or a transmitter module 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 610 may receive information such as packets, user data, and/or control information associated with various information channels (e.g., control channels, data channels, etc.). The receiver module 610 may be configured to receive system information including an SFN and/or hyper SFN and/or parameters for configuring an eI-DRX cycle. The system information may be passed on to the eI-DRX module 615, and to other components of the device 605.

The eI-DRX module 615 may identify a configuration for an eI-DRX cycle that may be indexed to a hyper SFN frame cycle. The eI-DRX cycle may include multiple legacy SFN frame cycles and thus may be greater than a maximum DRX cycle available for legacy UEs. The eI-DRX cycle may be configured according to a default eI-DRX cycle for the cell or the UE may request a different eI-DRX cycle, in some cases. The eI-DRX module 615 may determine the paging occasions for monitoring according to the eI-DRX cycle and may (e.g., via receiver 610) monitor the determined paging occasions. Determining the paging occasions for eI-DRX cycle may be performed as discussed above with reference to FIG. 4.

The transmitter module 620 may transmit one or more signals received from other components of the device 605. For example, the transmitter module 620 may transmit attach requests, paging responses, packet data, etc. In some examples, the transmitter module 620 may be collocated with the receiver module 610 in a transceiver module.

Figure 7:
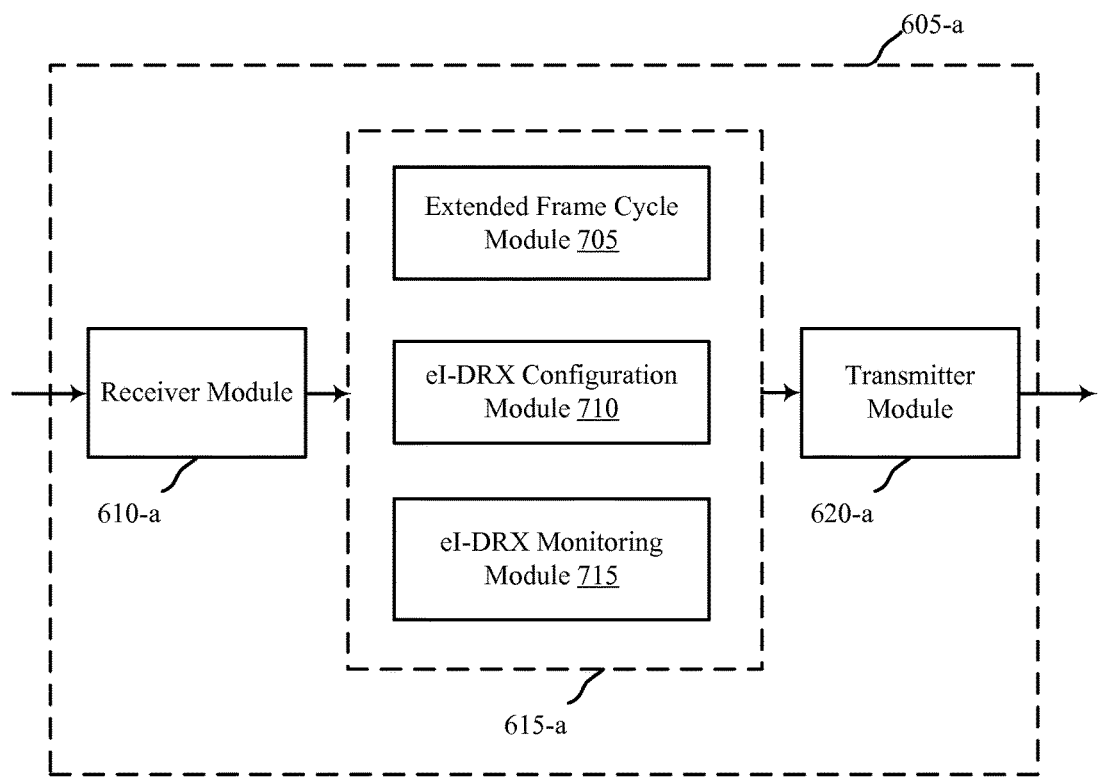
FIG. 7 shows a block diagram of a device configured for use in wireless communication, in accordance with various aspects of the present disclosure.

FIG. 7 shows a block diagram 700 of a device 605-a for use in wireless communication, in accordance with various examples. The device 605-a may be an example of one or more aspects of a UE 115 described with reference to FIGS. 1 and 2. It may also be an example of a device 605 described with reference to FIG. 6. The device 605-a may include a receiver module 610-a, an eI-DRX module 615-a, and/or a transmitter module 620-a, which may be examples of the corresponding modules of device 605. The device 605-a may also include a processor (not shown). Each of these components may be in communication with each other. The eI-DRX module 615-a may include an extended frame cycle module 705, an eI-DRX configuration module 710, and an eI-DRX monitoring module 715. The receiver module 610-a and the transmitter module 620-a may perform the functions of the receiver module 610 and the transmitter module 620, of FIG. 6, respectively.

The extended frame cycle module 705 may receive system information including SFN and/or hyper SFN indices from the receiver 610-a. The extended frame cycle module 705 may determine an extended SFN for each radio frame of an extended SFN frame cycle (e.g., hyper SFN cycle 320) based on the SFN and hyper SFN indices. The SFN index may be received via a physical broadcast channel while the hyper SFN index may be received in a SIB block via a physical downlink data channel.

The eI-DRX configuration module 710 may identify a configuration for eI-DRX operation for the device 605-a. For example, the eI-DRX configuration module 710 may determine parameters T', nB', N', Ns', UE_ID' for eI-DRX operation and may determine paging frames and paging occasions for an eI-DRX cycle. Determining paging frames and paging occasions for eI-DRX operation may be performed as described above with reference to FIG. 4. The eI-DRX configuration module 710 may determine the eI-DRX cycle from a default eI-DRX cycle broadcast for the cell, or the eI-DRX configuration module 710 may request a UE specific eI-DRX cycle (e.g., via RRC signaling, etc.).

The eI-DRX monitoring module 715 may perform monitoring for at least one paging occasion of the hyper frame cycle determined by the extended frame cycle module 705. For example, the eI-DRX monitoring module 715 may, via the receiver 610-a, monitor for paging messages in the paging occasions determined by the eI-DRX configuration module 710. The eI-DRX monitoring module 715 may monitor paging occasions for paging messages according to a P-RNTI, or an eP-RNTI that is different from the P-RNTI, in some embodiments.

Figure 8:
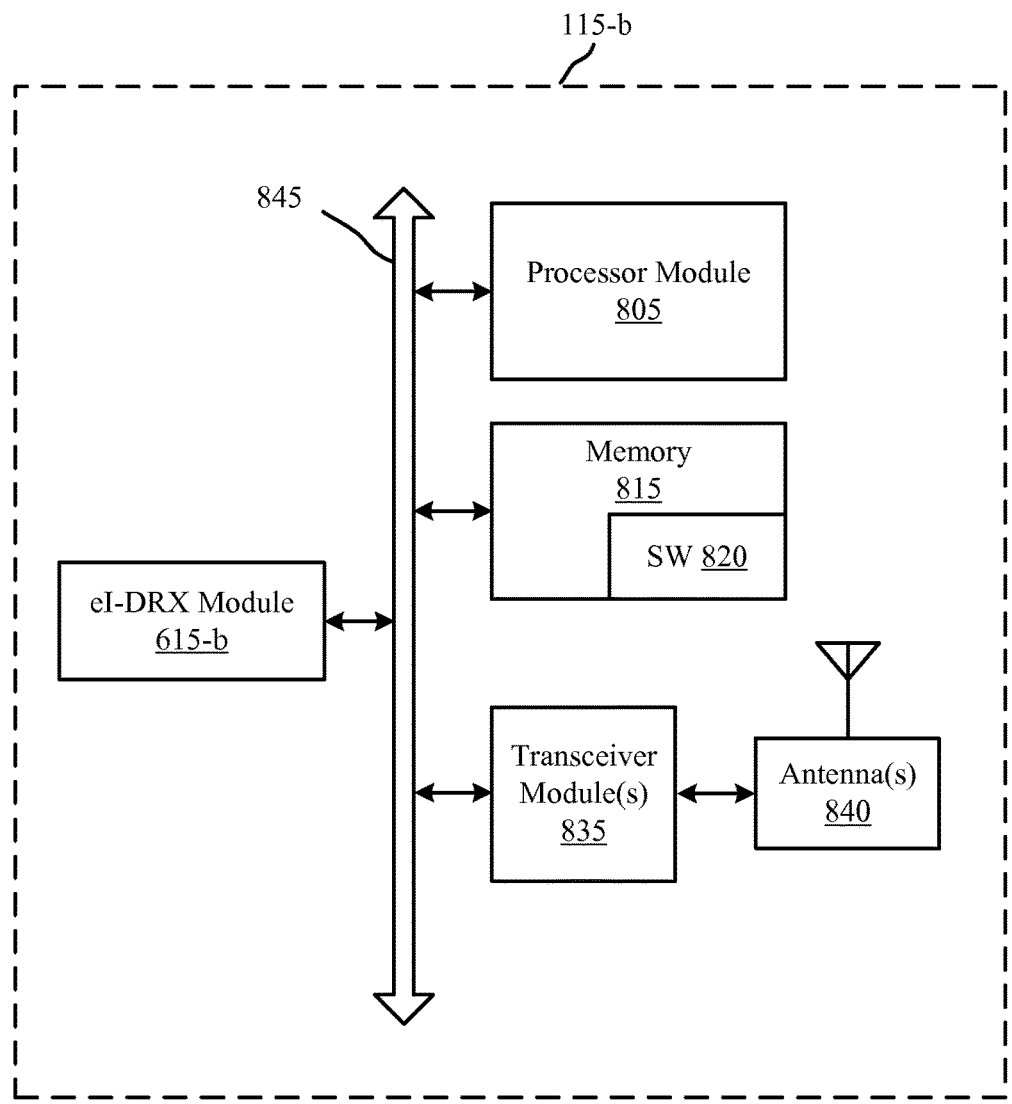
FIG. 8 shows a block diagram of an apparatus for use in wireless communication, in accordance with various aspects of the present disclosure.

FIG. 8 shows a system 800 for use in wireless communication, in accordance with various examples. System 800 may include a UE 115-b, which may be an example of the UEs 115 of FIGS. 1 and 2. UE 115-b may also be an example of one or more aspects of devices 605 of FIGS. 6 and 7.

The UE 115-b may generally include components for bi-directional voice and data communications including components for transmitting communications and components for receiving communications. The UE 115-b may include antenna(s) 840, a transceiver module 835, a processor module 805, and memory 815 (including software (SW) 820), which each may communicate, directly or indirectly, with each other (e.g., via one or more buses 845). The transceiver module 835 may be configured to communicate bi-directionally, via the antenna(s) 840 and/or one or more wired or wireless links, with one or more networks, as described above. For example, the transceiver module 835 may be configured to communicate bi-directionally with base stations 105 described with reference to FIGS. 1, 2, and 11. The transceiver module 835 may include a modem configured to modulate the packets and provide the modulated packets to the antenna(s) 840 for transmission, and to demodulate packets received from the antenna(s) 840. While the UE 115-b may include a single antenna 840, the UE 115-a may have multiple antennas 840 capable of concurrently transmitting and/or receiving multiple wireless transmissions. The transceiver module 835 may be capable of concurrently communicating with one or more base stations 105 via multiple component carriers.

The UE 115-b may include an eI-DRX module 615-b, which may be configured to perform and/or control some or all of the features and/or functions described with reference to FIGS. 2, 3, 4, 5, 6 and/or 7 related to eI-DRX operation using hyper-SFN extension signaling. The eI-DRX module 615-b may include a processor, and/or some or all of the functions of the eI-DRX module 615-b may be performed by the processor module 805 and/or in connection with the processor module 805 and memory 815. For example, the eI-DRX module 615-b may be part of the software/firmware code 820 and may include instructions that are configured to cause the processor module 805 to perform various functions described herein (e.g., receiving an SFN index, receiving a hyper SFN index, identifying an eI-DRX configuration, monitoring paging occasions according to the eI-DRX configuration, etc.). In some examples, the eI-DRX module 615-b may be an example of the eI-DRX modules 615 described with reference to FIGS. 6 and/or 7.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein. Alternatively, the computer-readable, computer-executable software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
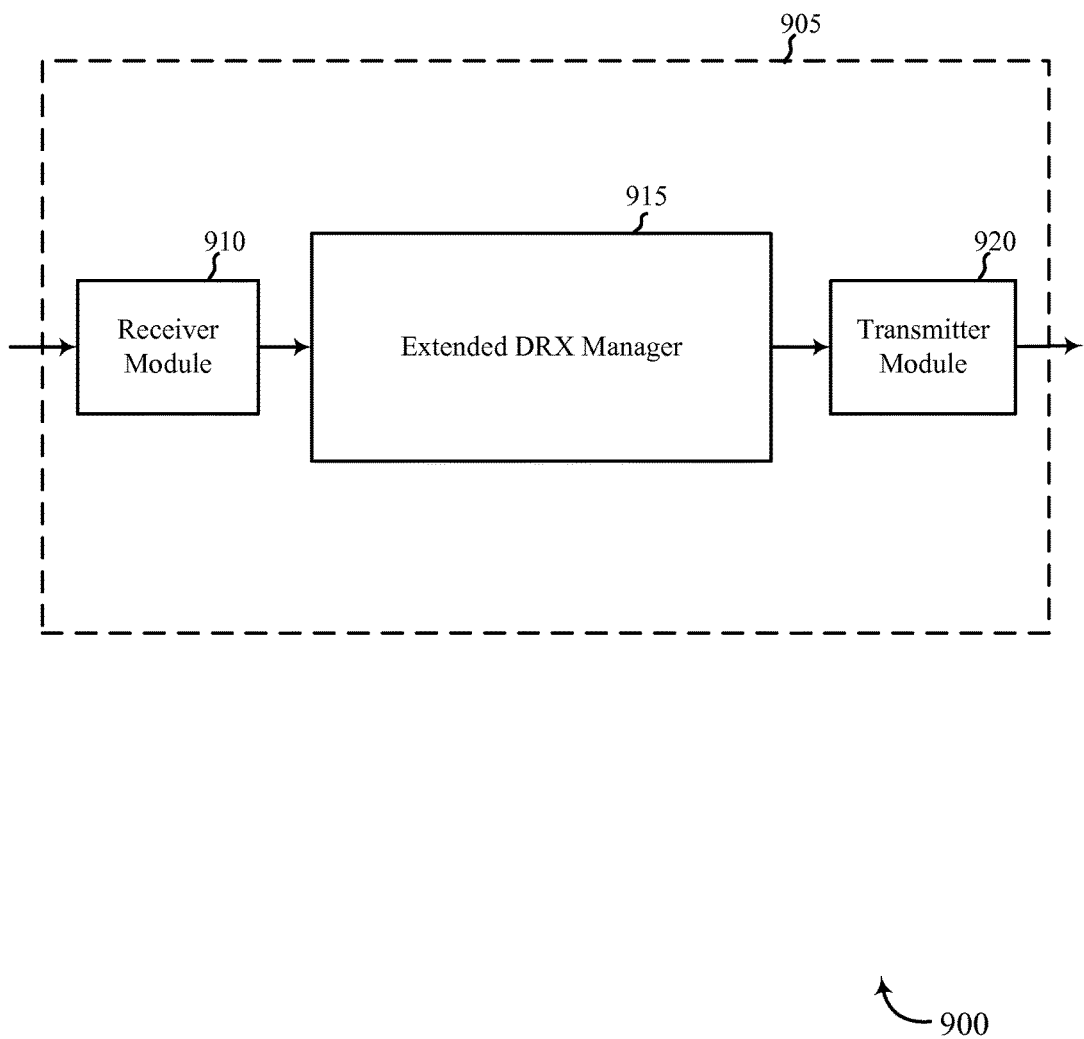
FIG. 9 shows a block diagram of a device for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105 described with reference to FIGS. 1 and 2. In some examples, the apparatus 905 may be part of or include an LTE/LTE-A eNB and/or an LTE/LTE-A base station. The apparatus 905 may also be a processor. The apparatus 905 may include a receiver module 910, an extended DRX manager 915, and/or a transmitter module 920. Each of these modules may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 910 may include at least one radio frequency (RF) receiver, such as an RF receiver operable to receive transmissions from one or more UEs 115. The receiver component 910 may be used to receive various types of data and/or control signals (i.e., transmissions) over one or more communication links of a wireless communication system, such as one or more communication links of the wireless communications system 100 described with reference to FIG. 1.

In some examples, the transmitter module 920 may include at least one RF transmitter, such as at least one RF transmitter operable to transmit information to one or more UEs 115. The transmitter module 920 may be used to transmit various types of data and/or control signals (i.e., transmissions) over one or more communication links of a wireless communication system, such as one or more communication links of the wireless communications system 100 described with reference to FIG. 1.

In some examples, the extended DRX manager 915 manages I-DRX operation for legacy UEs according to a legacy I-DRX mode and eI-DRX operation for non-legacy UEs according to an eI-DRX mode. The I-DRX mode and eI-DRX mode may utilize the same paging resources. Paging monitoring resources may be any resources which may indicate, or otherwise help determine, the paging resources. The I-DRX mode may operate according to a legacy frame cycle while the eI-DRX mode operates according to a hyper frame cycle, where each hyper frame cycle includes multiple legacy frame cycles. The extended DRX manager 915 may broadcast (e.g., via transmitter 920) an index to the frame cycle and an index to the hyper frame cycle. The frame cycle index may be broadcast using a physical broadcast channel (e.g., in the MIB, etc.). The hyper frame cycle index may be broadcast in a SIB via a physical downlink data channel.

The extended DRX manager 915 may broadcast an extended DRX cycle for the cell. The extended DRX cycle may be greater than a maximum DRX cycle for the legacy I-DRX mode. Additionally or alternatively, the extended DRX manager 915 may receive requests from non-legacy UEs for UE specific DRX cycles. The extended DRX manager 915 may determine paging frames and paging occasions for non-legacy UEs operating according to eI-DRX mode. The extended DRX manager 915 may transmit paging information (e.g., when downlink data is present in the network, etc.) in a paging occasion of an eI-DRX cycle for a non-legacy UE. The extended DRX manager 915 may transmit the paging information according to a P-RNTI, or an eP-RNTI that is different from the P-RNTI, in some embodiments.

Figure 10:
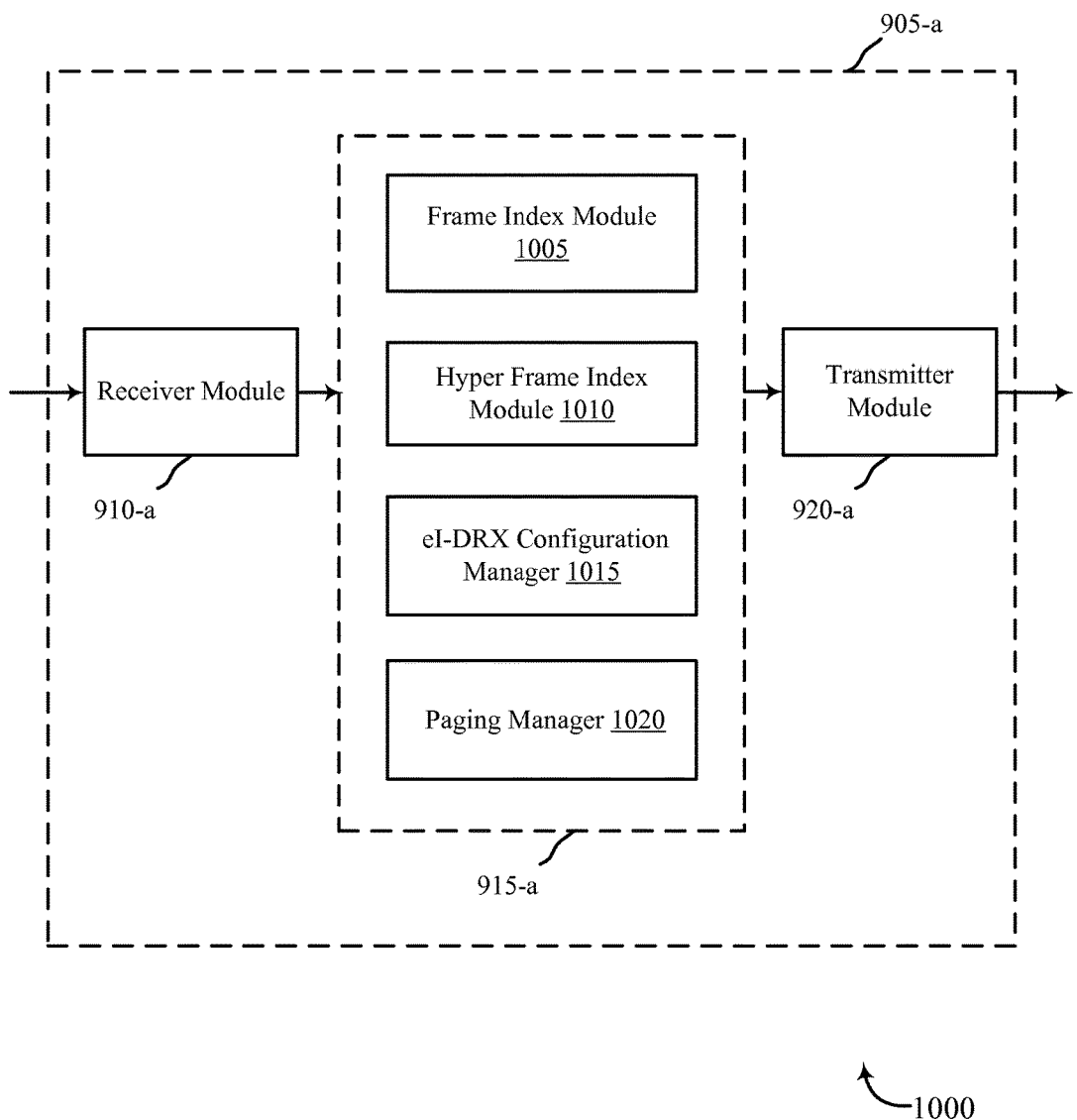
FIG. 10 shows a block diagram of a device for use in wireless communication, in accordance with various aspects of the present disclosure.

FIG. 10 shows a block diagram 1000 of an apparatus 905-a for use in wireless communication, in accordance with various aspects of the present disclosure. In some examples, the apparatus 905-a may be an example of aspects of one or more of the base stations 105 described with reference to FIGS. 1 and 2, and/or an example of aspects of the apparatus 905 described with reference to FIG. 9. In some examples, the apparatus 905-a may be part of or include an LTE/LTE-A eNB and/or an LTE/LTE-A base station. The apparatus 905-a may also be a processor. The apparatus 905-a may include a receiver module 910-a, an extended DRX manager 915-a, and/or a transmitter module 920-a. The extended DRX manager 915-a may be an example of the extended DRX manager 915 of FIG. 9. Each of these modules may be in communication with each other.

The components of the apparatus 905-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 910-a may be an example of one or more aspects of the receiver module 910 described with reference to FIG. 10. In some examples, the transmitter module 920-a may be an example of one or more aspects of the transmitter module 920 described with reference to FIG. 10.

The extended DRX manager 915-a may be configured for extended DRX (e-DRX) operation using hyper-SFN extension signaling. The extended DRX manager 915-a may include a frame index module 1005, a hyper frame index module 1010, an eI-DRX configuration manager 1015, and/or a paging manager 1020.

The frame index module 1005 may broadcast (e.g., via transmitter 920-a) a frame index, which may be an index to a legacy SFN range. For example, the frame index module 1005 may transmit the eight most-significant bits of the SFN in the MIB. The MIB may be transmitted via the physical broadcast channel (PBCH).

The hyper frame index module 1010 may broadcast (e.g., via transmitter 920-a) a hyper frame index. The hyper frame index may be broadcast by transmitting an index to the hyper-SFN as part of an information block (e.g., SIB, etc.) that is different from the MIB. For example, the index to the hyper-SFN may be transmitted in SIB1 or SIB2 via a shared data channel.

The eI-DRX configuration manager 1015 may configure non-legacy UEs for operation in eI-DRX mode. For example, the eI-DRX configuration manager 1015 may broadcast (e.g., via transmitter 920-a) a default eI-DRX cycle and may receive (e.g., via receiver 910-a) requests for UE specific eI-DRX cycles from non-legacy UEs 115. The eI-DRX configuration manager 1015 may determine parameters for operation of non-legacy UEs 115 (e.g., T', nB', N', Ns', UE_ID', etc.) and may determine paging frames and paging occasions for the UEs operating in eI-DRX mode as described above with reference to FIG. 4.

Figure 11:
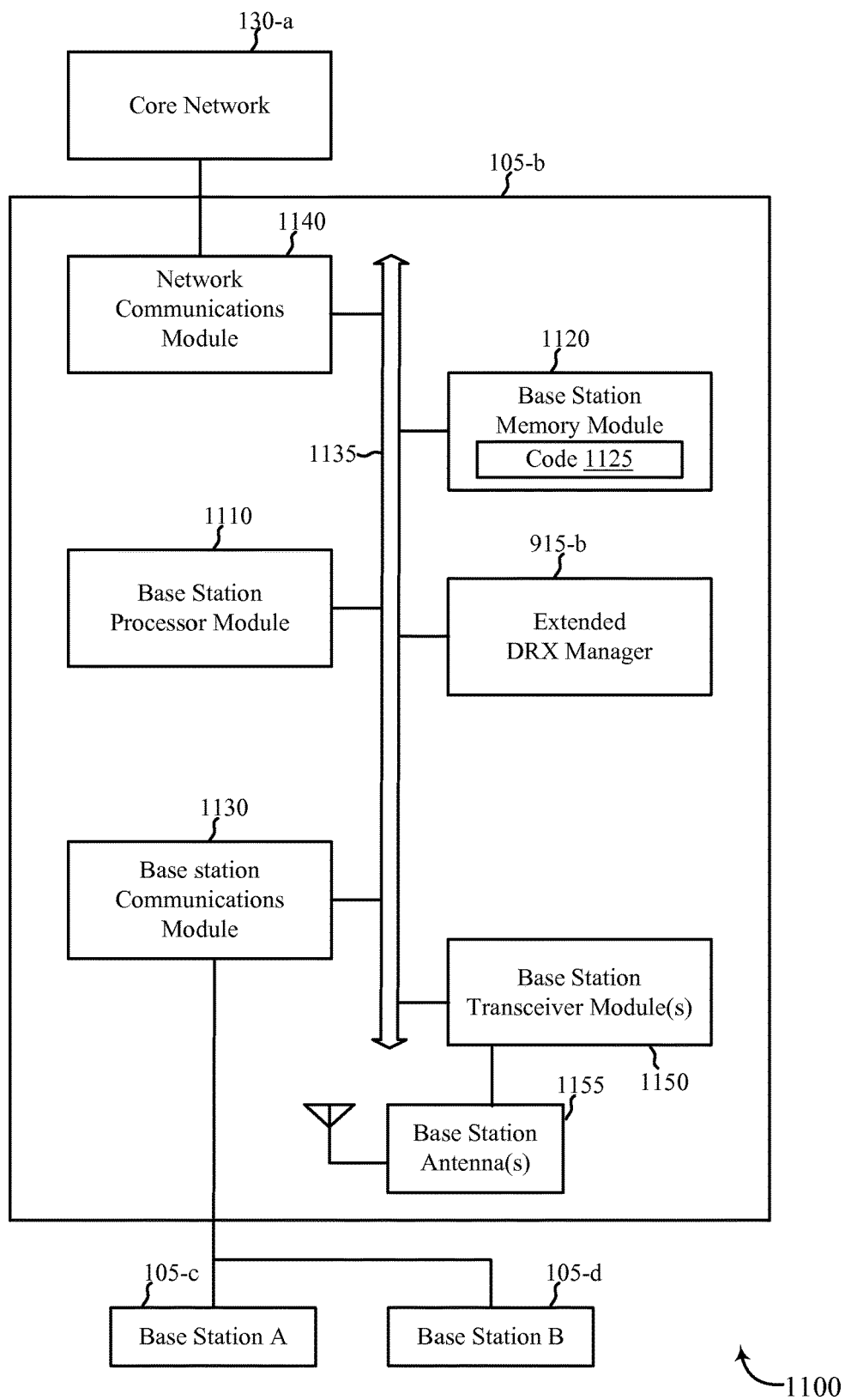
FIG. 11 shows a block diagram of a base station for use in wireless communication, in accordance with various aspects of the present disclosure.

FIG. 11 shows a block diagram 1100 of a base station 105-b (e.g., a base station forming part or all of an eNB) for use in wireless communication, in accordance with various aspects of the present disclosure. In some examples, the base station 105-b may be an example of aspects of one or more of the base stations 105 described with reference to FIGS. 1 and 2, and/or aspects of one or more of the apparatuses 905 when configured as a base station, as described with reference to FIGS. 9 and/or 10. The base station 105-b may be configured to implement or facilitate at least some of the base station and/or apparatus features and functions described with reference to FIGS. 1, 2, 9, and/or 10.

The base station 105-b may include a base station processor module 1110, a base station memory module 1120, one or more base station transceiver module(s) 1150, one or more base station antenna(s) 1255, and/or an extended DRX manager 915-b. The base station 105-b may also include one or more of a base station communications module 1130 and/or a network communications module 1140. Each of these modules may be in communication with each other, directly or indirectly, over one or more buses 1135.

The base station memory module 1120 may include random access memory (RAM) and/or read-only memory (ROM). The base station memory module 1120 may store computer-readable, computer-executable software/firmware code 1125 containing instructions that are configured to, when executed, cause the base station processor module 1110 to perform various functions described herein related to wireless communication (e.g., broadcasting frame index, broadcasting hyper frame index, broadcasting a default eI-DRX cycle, configuring non-legacy UEs for operation in eI-DRX mode, paging non-legacy UEs in eI-DRX mode according to a hyper frame cycle, etc.). Alternatively, the computer-readable, computer-executable software/firmware code 1125 may not be directly executable by the base station processor module 1110 but be configured to cause the base station processor module 1110 (e.g., when compiled and executed) to perform various of the functions described herein.

The base station processor module 1110 may include an intelligent hardware device, e.g., a central processing unit (CPU), a microcontroller, an ASIC, etc. The base station processor module 1110 may process information received through the base station transceiver module(s) 1150, the base station communications module 1130, and/or the network communications module 1140. The base station processor module 1110 may also process information to be sent to the transceiver module(s) 1150 for transmission through the antenna(s) 1155, to the base station communications module 1130, for transmission to one or more other base stations 105-*c* and 105-*d*, and/or to the network communications module 1140 for transmission to a core network 130-*a*, which may be an example of one or more aspects of the core network 130 described with reference to FIG. 1. The base station processor module 1110 may handle, alone or in connection with the extended DRX manager 915-*b*, various aspects of eI-DRX operation using hyper-SFN extension signaling.

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may support communications in a first radio frequency spectrum band and/or a second radio frequency spectrum band. The base station transceiver module(s) 1150 may be configured to communicate bi-directionally, via the antenna(s) 1155, with one or more UEs or apparatuses, such as one or more of the UEs 115 described with reference to FIGS. 1, 2, and/or 8. The base station 105-*b* may, for example, include multiple base station antennas 1155 (e.g., an antenna array). The base station 105-*b* may communicate with the core network 130-*a* through the network communications module 1140. The base station 105-*b* may also communicate with other base stations, such as the base stations 105-*c* and 105-*d*, using the base station communications module 1130.

The extended DRX manager 915-*b* may be configured to perform and/or control some or all of the features and/or functions described with reference to FIGS. 2, 3, 4, 5, 9 and/or 10 related to eI-DRX operation using hyper-SFN extension signaling. The extended DRX manager 915-*b* may include a processor, and/or some or all of the functions of the extended DRX manager 915-*b* may be performed by the base station processor module 1110 and/or in connection with the base station processor module 1110. In some examples, the extended DRX manager 915-*b* may be an example of the extended DRX managers 915 described with reference to FIGS. 9 and/or 10.

Figure 12:
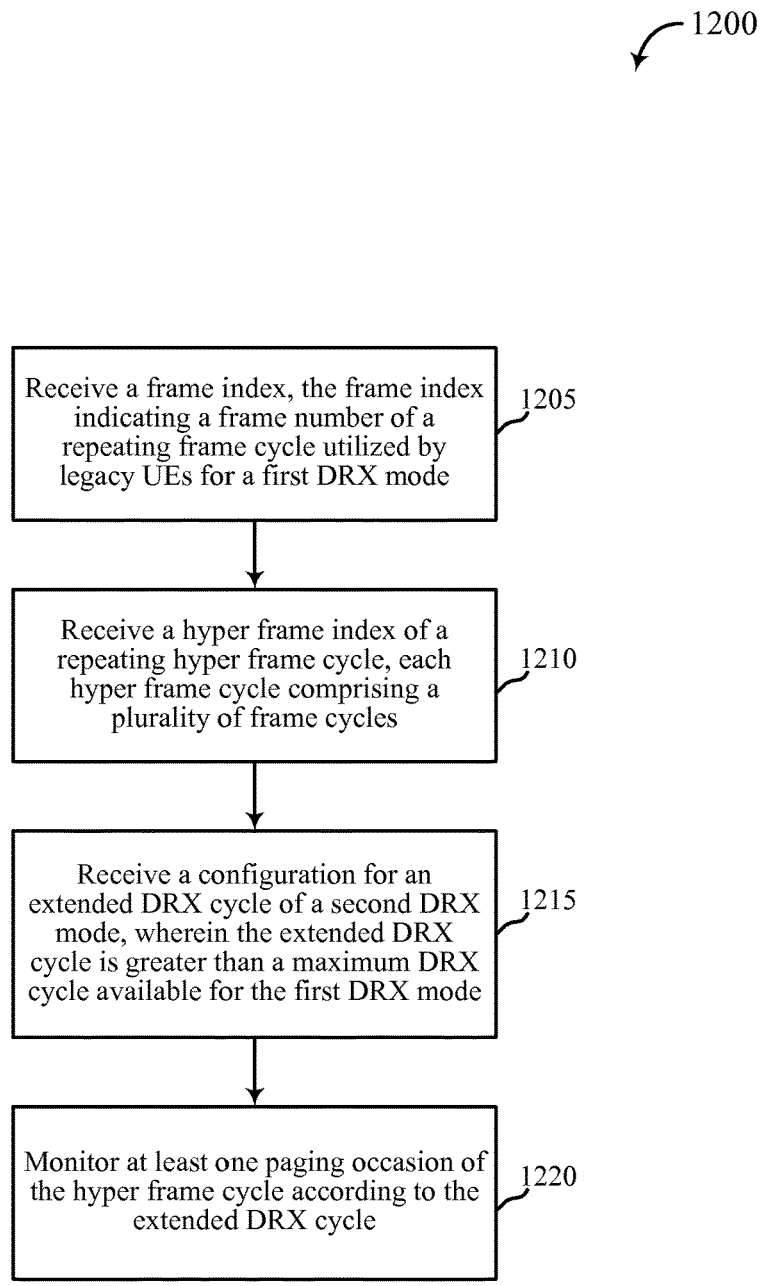
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the non-legacy UEs 115 described with reference to FIGS. 1, 2 and/or 8, and/or aspects of one or more of the devices 605 described with reference to FIGS. 6 and 7. In some examples, a UE 115 may execute one or more sets of codes to control the functional elements of the UE 115 to perform the functions described below. Additionally or alternatively, the UE 115 may perform one or more of the functions described below using special-purpose hardware.

At block 1205, the method 1200 may include receiving a frame index indicating a frame number of a repeating frame cycle. In some cases, the frame index may be computed or otherwise determined. The frame cycle may be, for example, the same as a frame cycle utilized by legacy UEs for a first DRX mode (e.g., I-DRX mode). The frame index may be received via a physical broadcast channel.

At block 1210, the method 1200 may include receiving a hyper frame index of a repeating hyper frame cycle. Each hyper frame cycle may, for example, include multiple frame cycles. The hyper frame index may be received via a physical downlink data channel.

At block 1215, the method 1200 may include identifying a configuration for an extended DRX cycle. The extended DRX cycle may be used for operation in a second DRX mode (e.g., eI-DRX mode). The extended DRX cycle may be, for example, greater than a maximum DRX cycle available for the I-DRX mode used by legacy UEs.

At block 1220, the method 1200 may include monitoring at least one paging occasion of the hyper frame cycle according to the extended DRX cycle. The at least one paging occasion may be determined based on an extended UE identifier having a range of possible values greater than a number of indices in the frame cycle.

Where paging information is present at block 1220, the method 1200 may include receiving the paging information. The paging information may be identified using the P-RNTI used for paging in the first DRX mode or an eP-RNTI that is different from the P-RNTI.

Figure 13:
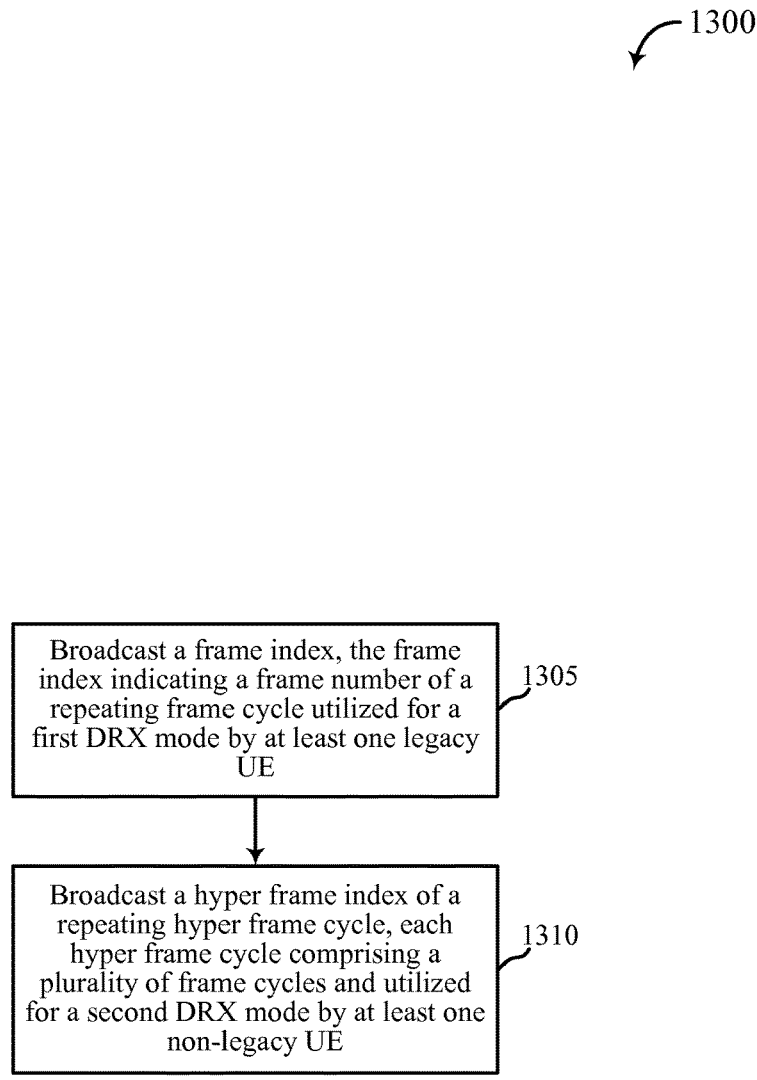
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the eNBs 105 described with reference to FIGS. 1, 2 and/or 11, and/or aspects of one or more of the devices 905 described with reference to FIGS. 9 and 10. In some examples, an eNB 105 may execute one or more sets of codes to control the functional elements of the eNB 105 to perform the functions described below. Additionally or alternatively, the eNB 105 may perform one or more of the functions described below using special-purpose hardware. The method 1300 may be used, for example, for extending DRX operation using hyper-SFN extension signaling.

At block 1305, the method 1300 may include broadcasting a frame index, the frame index indicating a frame number of a repeating frame cycle utilized for a first DRX mode by at least one legacy user equipment (UE). In some cases, the frame index may be used to compute or otherwise determine the frame number of the repeating frame cycle utilized for the first DRX mode by at least one legacy UE.

Broadcasting the frame index may be performed by transmitting the frame index via a physical broadcast channel (e.g., MIB, etc.).

At block 1305, the method 1300 may include broadcasting a hyper frame index of a repeating hyper frame cycle, each hyper frame cycle comprising a plurality of frame cycles and utilized for a second DRX mode by at least one non-legacy UE. Broadcasting the hyper frame index may be performed by transmitting the hyper frame index via a physical downlink data channel (e.g., in a SIB, etc.).

Figure 14:
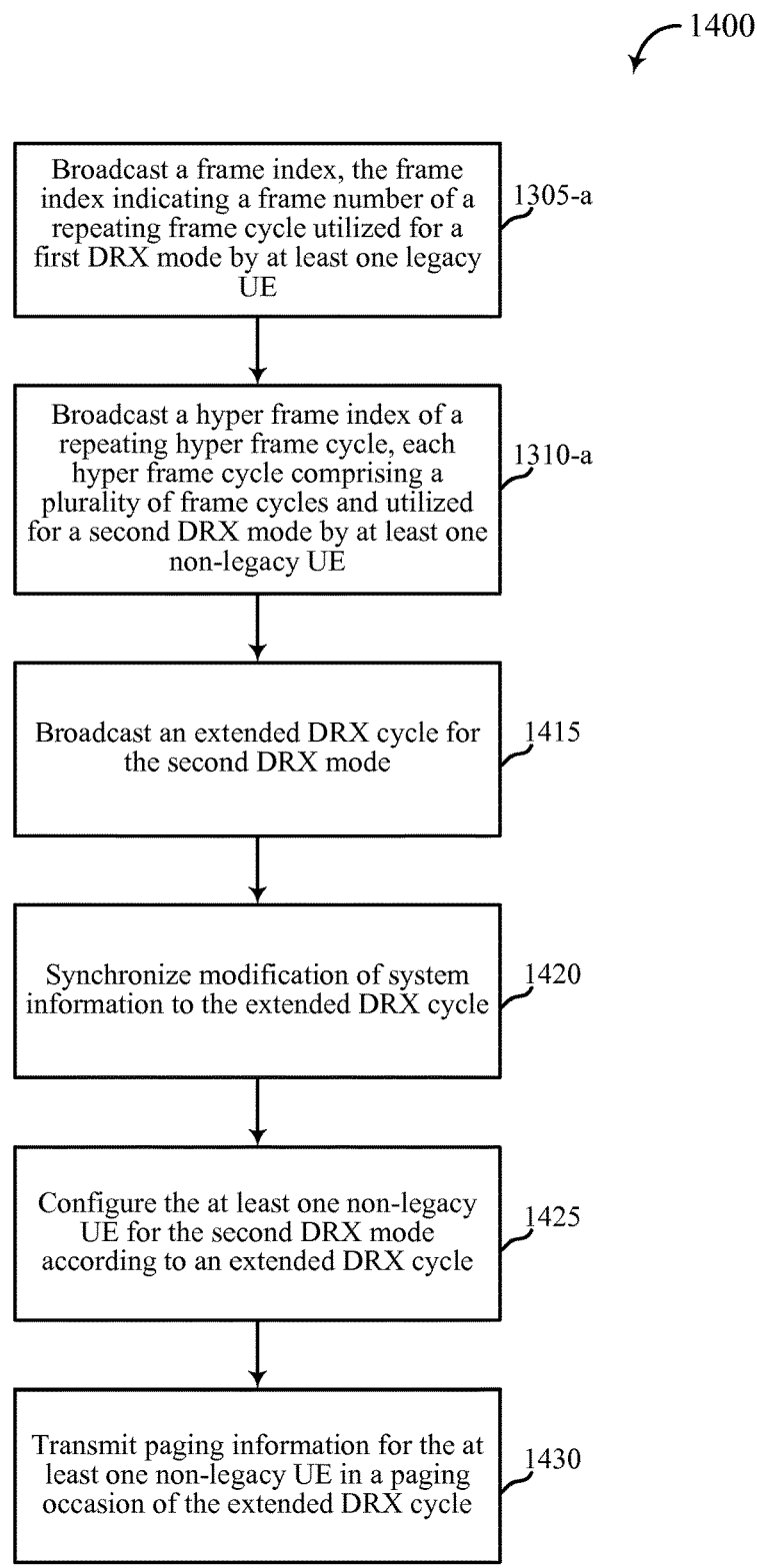
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1300 is described below with reference to aspects of one or more of the eNBs 105 described with reference to FIGS. 1, 2 and/or 11, and/or aspects of one or more of the devices 905 described with reference to FIGS. 9 and 10. In some examples, an eNB 105 may execute one or more sets of codes to control the functional elements of the eNB 105 to perform the functions described below. Additionally or alternatively, the eNB 105 may perform one or more of the functions described below using special-purpose hardware. The method 1400 may be used, for example, for extending DRX operation using hyper-SFN extension signaling.

At block 1305-a, the method 1400 may include broadcasting a frame index, the frame index indicating a frame number of a repeating frame cycle utilized for a first DRX mode by at least one legacy user equipment (UE).

At block 1310-a, the method 1400 may include broadcasting a hyper frame index of a repeating hyper frame cycle, each hyper frame cycle comprising a plurality of frame cycles and utilized for a second DRX mode by at least one non-legacy UE.

At block 1415, the method 1400 may include broadcasting the extended DRX cycle for the second DRX mode.

At block 1420, the method 1400 may include synchronizing modification of system information to the eI-DRX cycle. For example, an extended system information modification period may be determined based on the default eI-DRX cycle for the cell. Thus, modification of system information may be allowed to occur at the boundaries of the longest eI-DRX cycle. In some examples, modification indications for legacy UEs may be sent in paging messages during a last modification period within the extended system information modification period.

At block 1425, the method 1400 may include configuring the at least one non-legacy UE for the second DRX mode according to an extended DRX cycle greater than a maximum DRX cycle available for the first DRX mode.

At block 1430, the method 1400 may include transmitting paging information for the at least one non-legacy UE in a paging occasion of the extended DRX cycle. The paging information may be identified by a second RNTI (e.g., eP-RNTI) that is different from a first RNTI used by the least one legacy UE for receiving paging information.

In some examples, aspects from two or more of the methods 1200, 1300, and/or 1400 may be combined. It should be noted that the methods 1200, 1300, and 1400 are just example implementations, and that the operations of the methods 1200, 1300, and 1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for discontinuous reception (DRX) operation in a wireless communication system, comprising:
broadcasting a frame index of a frame cycle utilized for a first DRX mode by at least one legacy user equipment (UE);
broadcasting a hyper frame index of a hyper frame cycle associated with an extended DRX cycle, each hyper frame cycle comprising a plurality of frame cycles and utilized for a second DRX mode by at least one non-legacy UE;
determining a system information modification period based at least in part on the frame index;
transmitting a message indicating an update in system information, the message comprising an indication of a time period, different from the system information modification period, in which the at least one non-legacy UE is to acquire the updated system information, wherein the message is transmitted before the indicated time period; and
transmitting the updated system information based at least in part on the indication.

2. The method of claim 1, further comprising:
configuring the at least one non-legacy UE for the second DRX mode according to the extended DRX cycle, the extended DRX cycle being greater than a maximum DRX cycle available for the first DRX mode.

3. The method of claim 2, further comprising:
broadcasting the extended DRX cycle for the second DRX mode.

4. The method of claim 1, further comprising:
determining a paging frame based at least in part on the hyper frame cycle; and
transmitting paging information for the at least one non-legacy UE in a paging occasion of the paging frame.

5. The method of claim 4, wherein the paging information is identified by a second radio network temporary identifier (RNTI) that is different from a first RNTI used by the at least one legacy UE for receiving paging information.

6. The method of claim 1, wherein broadcasting the hyper frame index comprises transmitting the hyper frame index using a second information block different from a first information block used for broadcasting the frame index.

7. The method of claim 1, wherein broadcasting the frame index comprises transmitting the frame index via a physical broadcast channel.

8. The method of claim 1, wherein broadcasting the hyper frame index comprises transmitting the hyper frame index in a system information block (SIB) via a physical downlink data channel.

9. The method of claim 1, wherein the second DRX mode comprises an idle DRX (I-DRX) mode.

10. The method of claim 1, further comprising:
determining an extended system information modification period based at least in part on the hyper frame cycle; and
synchronizing the extended system information modification period for the at least one non-legacy UE.

11. A method for discontinuous reception (DRX) operation at a user equipment (UE) in a wireless communication system, comprising:
computing a frame index of a frame cycle utilized by legacy user equipments (UEs) for a first DRX mode;
receiving a hyper frame index of a hyper frame cycle;
determining a plurality of frames of an extended frame cycle based on the frame index and the hyper frame index, the extended frame cycle associated with an extended DRX cycle of a second DRX mode, wherein the extended DRX cycle is greater than a maximum DRX cycle available for the first DRX mode;
determining a system information modification period based at least in part on the frame index;
receiving a message indicating an update in system information, the message comprising an indication of a time period, different from the system information modification period, in which the UE is to acquire the updated system information, wherein the message is received before the indicated time period; and
receiving the updated system information based at least in part on the indication.

12. The method of claim 11, further comprising:
determining a paging frame in the plurality of frames based at least in part on a UE identifier and the hyper frame cycle, wherein the paging frame comprises at least one paging occasion having a range of possible values larger than a number of indices of the frame cycle.

13. The method of claim 12, further comprising:
receiving paging information in at least one paging occasion of the paging frame.

14. The method of claim 13, wherein the paging information is identified by a second radio network temporary identifier (RNTI) that is different from a first RNTI used by legacy UEs for receiving paging information.

15. The method of claim 11, wherein computing the frame index comprises receiving the frame index via a physical broadcast channel.

16. The method of claim 11, wherein receiving the hyper frame index comprises receiving the hyper frame index in a system information block (SIB) via a physical downlink data channel.

17. The method of claim 11, wherein the second DRX mode comprises an idle DRX (I-DRX) mode.

18. The method of claim 11, further comprising:
entering a low power state in between receiving the message and acquiring the updated system information.

19. An apparatus for discontinuous reception (DRX) operation in a wireless communication system, comprising:
a processor; and
a memory in electronic communication with the processor and instructions stored in the memory, the instructions being executable by the processor to:
broadcast a frame index of a frame cycle utilized for a first DRX mode by at least one legacy user equipment (UE);
broadcast a hyper frame index of a hyper frame cycle associated with an extended DRX cycle, each hyper frame cycle comprising a plurality of frame cycles and utilized for a second DRX mode by at least one non-legacy UE;
determine a system information modification period based at least in part on the frame index;
transmit a message indicating an update in system information, the message comprising an indication of a time period, different from the system information modification period, in which the at least one non-legacy UE is to acquire the updated system information, wherein the message is transmitted before the indicated time period; and
transmit the updated system information based at least in part on the indication.

20. The apparatus of claim 19, wherein the instructions are further executable by the processor to:
configure the at least one non-legacy UE for the second DRX mode according to the extended DRX cycle, the extended DRX cycle being greater than a maximum DRX cycle available for the first DRX mode.

21. The apparatus of claim 20, wherein the instructions are further executable by the processor to:
broadcast the extended DRX cycle for the second DRX mode.

22. The apparatus of claim 20, wherein the instructions are further executable by the processor to:
determine a paging frame based at least in part on the hyper frame cycle; and
transmit paging information for the at least one non-legacy UE in a paging occasion of the paging frame.

23. The apparatus of claim 22, wherein the paging information is identified by a second radio network temporary identifier (RNTI) that is different from a first RNTI used by the at least one legacy UE for receiving paging information.

24. The apparatus of claim 19, wherein broadcasting the hyper frame index comprises transmitting the hyper frame index using a second information block different from a first information block used for broadcasting the frame index.

25. The apparatus of claim 19, wherein the instructions are further executable by the processor to:
determine an extended system information modification period based at least in part on the hyper frame cycle; and
synchronize the extended system information modification period for the at least one non-legacy UE.

26. An apparatus for discontinuous reception (DRX) operation at a user equipment (UE) in a wireless communication system, comprising:
a processor; and
a memory in electronic communication with the processor and instructions stored in the memory, the instructions being executable by the processor to:
compute a frame index of a frame cycle utilized by legacy user equipments (UEs) for a first DRX mode;
receive a hyper frame index of a hyper frame cycle;
determine a system information modification period based at least in part on the frame index;
receive a message indicating an update in system information, the message comprising an indication of a time period, different from the system information modification period, in which the UE is to acquire the updated system information, wherein the message is received before the indicated time period; and
receive the updated system information based at least in part on the indication.

27. The apparatus of claim 26, further comprising:
determining a paging frame in the plurality of frames based at least in part on a UE identifier and the hyper frame cycle, wherein the paging frame comprises at least one paging occasion having a range of possible values larger than a number of indices of the frame cycle.

28. The apparatus of claim 27, wherein the instructions are further executable by the processor to:
receive paging information in at least one paging occasion of the paging frame.

29. The apparatus of claim 28, wherein the paging information is identified by a second radio network temporary identifier (RNTI) that is different from a first RNTI used by legacy UEs for receiving paging information.

30. The apparatus of claim 26, wherein computing the frame index comprises receiving the frame index via a physical broadcast channel.

31. The apparatus of claim 26, wherein receiving the hyper frame index comprises receiving the hyper frame index in a system information block (SIB) via a physical downlink data channel.

\* \* \* \* \*